US011888386B2

(12) United States Patent
Kojima

(10) Patent No.: US 11,888,386 B2
(45) Date of Patent: Jan. 30, 2024

(54) POWER CONVERSION DEVICE

(71) Applicant: Mitsubishi Electric Corporation, Tokyo (JP)

(72) Inventor: Tetsuya Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 239 days.

(21) Appl. No.: 17/602,844

(22) PCT Filed: May 23, 2019

(86) PCT No.: PCT/JP2019/020535
§ 371 (c)(1),
(2) Date: Oct. 11, 2021

(87) PCT Pub. No.: WO2020/235101
PCT Pub. Date: Nov. 26, 2020

(65) Prior Publication Data
US 2022/0149751 A1 May 12, 2022

(51) Int. Cl.
*H02M 1/12* (2006.01)
*H02M 7/5387* (2007.01)
(Continued)

(52) U.S. Cl.
CPC ........... *H02M 1/123* (2021.05); *H02M 7/483* (2013.01); *H02M 7/5395* (2013.01); *H02M 7/53875* (2013.01); *H02M 7/4835* (2021.05)

(58) Field of Classification Search
CPC .. H02M 1/123; H02M 7/483; H02M 7/53875; H02M 7/5395; H02M 7/4835; H02M 1/38; H02M 7/487
See application file for complete search history.

(56) References Cited

U.S. PATENT DOCUMENTS 8,611,120 B2   12/2013   Okuda et al.
8,625,307 B2   1/2014    Iwata et al.
(Continued)

FOREIGN PATENT DOCUMENTS

JP       5291180 B2       6/2013
WO    2010/103600 A1    9/2010
(Continued)

OTHER PUBLICATIONS

Office Action dated Jun. 14, 2022 for the corresponding Japanese patent application No. 2021-520023 with an English machine translation thereof, 10 pp.
(Continued)

*Primary Examiner* — Kyle J Moody
(74) *Attorney, Agent, or Firm* — XSENSUS LLP

(57) ABSTRACT

A power conversion device includes a power conversion controller that generates gate signals for controlling operation of a three-phase three-level inverter and of three single-phase inverters, based on sinusoidal phase voltage commands. In the power conversion controller, the sinusoidal phase voltage commands are divided into three-phase instantaneous voltage commands to be indicated to the three-phase three-level inverter, and mean voltage commands to be indicated to the respective three single-phase inverters. When the sum of the three-phase instantaneous voltage commands is a positive value, a common voltage component is superimposed on each of the three mean voltage commands to make the sum of the three mean voltage commands a non-positive value, and when the sum of the three-phase instantaneous voltage commands is a negative value, the common voltage component is superimposed on each of the three mean voltage commands, making the sum of the three mean voltage commands non-negative.

8 Claims, 24 Drawing Sheets

(51) Int. Cl.
*H02M 7/5395* (2006.01)
*H02M 7/483* (2007.01)

(56) References Cited

U.S. PATENT DOCUMENTS

| | | | |
|---|---|---|---|
| 9,595,887 B2 | 3/2017 | Takahara et al. | |
| 2009/0116268 A1* | 5/2009 | Kishida | H02M 7/797 363/68 |
| 2019/0334452 A1* | 10/2019 | Hattori | H02M 7/53871 |
| 2022/0255457 A1* | 8/2022 | Kojima | H02M 7/49 |
| 2023/0299692 A1* | 9/2023 | Kojima | H02M 1/0845 363/41 |

FOREIGN PATENT DOCUMENTS

| | | |
|---|---|---|
| WO | 2010/146637 A1 | 12/2010 |
| WO | 2014/125697 A1 | 8/2014 |

OTHER PUBLICATIONS

Extended European Search Report dated May 5, 2022, in corresponding European patent application No. 19929503.1.
International Search Report and Written Opinion dated Jun. 25, 2019, received for PCT Application PCT/JP2019/020535, Filed on May 23, 2019, 9 pages including English Translation.

\* cited by examiner

POWER CONVERSION DEVICE

CROSS-REFERENCE TO RELATED APPLICATION

The present application is based on PCT filing PCT/JP2019/020535, filed May 23, 2019, the entire contents of which are incorporated herein by reference.

FIELD

The present invention relates to a power conversion device that converts direct current (DC) power into alternating current (AC) power for a load, and supplies the AC power to the load with reduced noise or harmonic.

BACKGROUND

An example of a power conversion device that converts DC power into AC power for a load, and supplies the AC power to the load with reduced noise or harmonic is described in Patent Literature 1 described below. The power conversion device described in Patent Literature 1 is a device of a type called cascaded multilevel inverter, in which a single-phase inverter is connected in series with each phase of a three-phase three-level inverter. An inverter of this type is advantageous in capability of reduction in the DC-side capacitor voltage of the single-phase inverters as compared to a configuration in which a three-phase two-level inverter and single-phase inverters are connected in series to each other. Reduction in the DC-side capacitor voltage of the single-phase inverters enables size reduction, and hence cost reduction, of the device. Thus, a power conversion device of this type can provide size reduction and cost reduction.

CITATION LIST

Patent Literature

Patent Literature 1: WO 2010/103600 A

SUMMARY

Technical Problem

Supply of AC power to a load using an inverter may suffer from a problem of common mode voltage. A common mode voltage is a voltage that may cause a zero-phase current, which is caused by a change in the neutral point potential of the load and flows through a cable connecting together the inverter and the load or via stray capacitance of the load. A flow of zero-phase current may cause common mode noise, which has an adverse effect on a peripheral device, or may degrade the bearing of a motor that is the load. Thus, common mode noise needs to be reduced. Meanwhile, reduction in common mode noise requires a large-sized heavy EMI filter, which will present a problem of increase in the device size.

The present invention has been made in view of the foregoing, and it is an object of the present invention to provide a power conversion device capable of reducing common mode noise while avoiding an increase in the device size.

Solution to Problem

To solve the problem and achieve the object described above, the present invention is directed to a power conversion device that converts direct current power into alternating current power for a load, and supplies the alternating current power to the load. The power conversion device includes a three-phase three-level inverter connected between positive and negative terminals of a direct current power supply, and three single-phase inverters respectively connected between the load and alternating current terminals of respective phases different from one another, of the three-phase three-level inverter. The power conversion device also includes a controller that generates gate signals for controlling operation of the three-phase three-level inverter and of the three single-phase inverters, based on sinusoidal phase voltage commands. The controller divides the sinusoidal phase voltage commands into three-phase instantaneous voltage commands to be indicated to the three-phase three-level inverter and mean voltage commands to be indicated to the respective three single-phase inverters. In addition, in a case in which a sum of the three-phase instantaneous voltage commands is a positive value, the controller superimposes a common voltage component on each of the three mean voltage commands to make a sum of the three mean voltage commands a non-positive value. Moreover, in a case in which the sum of the three-phase instantaneous voltage commands is a negative value, the controller superimposes the common voltage component on each of the three mean voltage commands to make the sum of the three mean voltage commands a non-negative value.

Advantageous Effects of Invention

A power conversion device according to the present invention provides an advantage in capability of reducing common mode noise while avoiding an increase in the device size.

DESCRIPTION OF EMBODIMENTS

A power conversion device according to embodiments of the present invention will be described in detail below with reference to the accompanying drawings. Note that the embodiments below are not intended to limit the scope of the present invention.

First Embodiment

Figure 1:
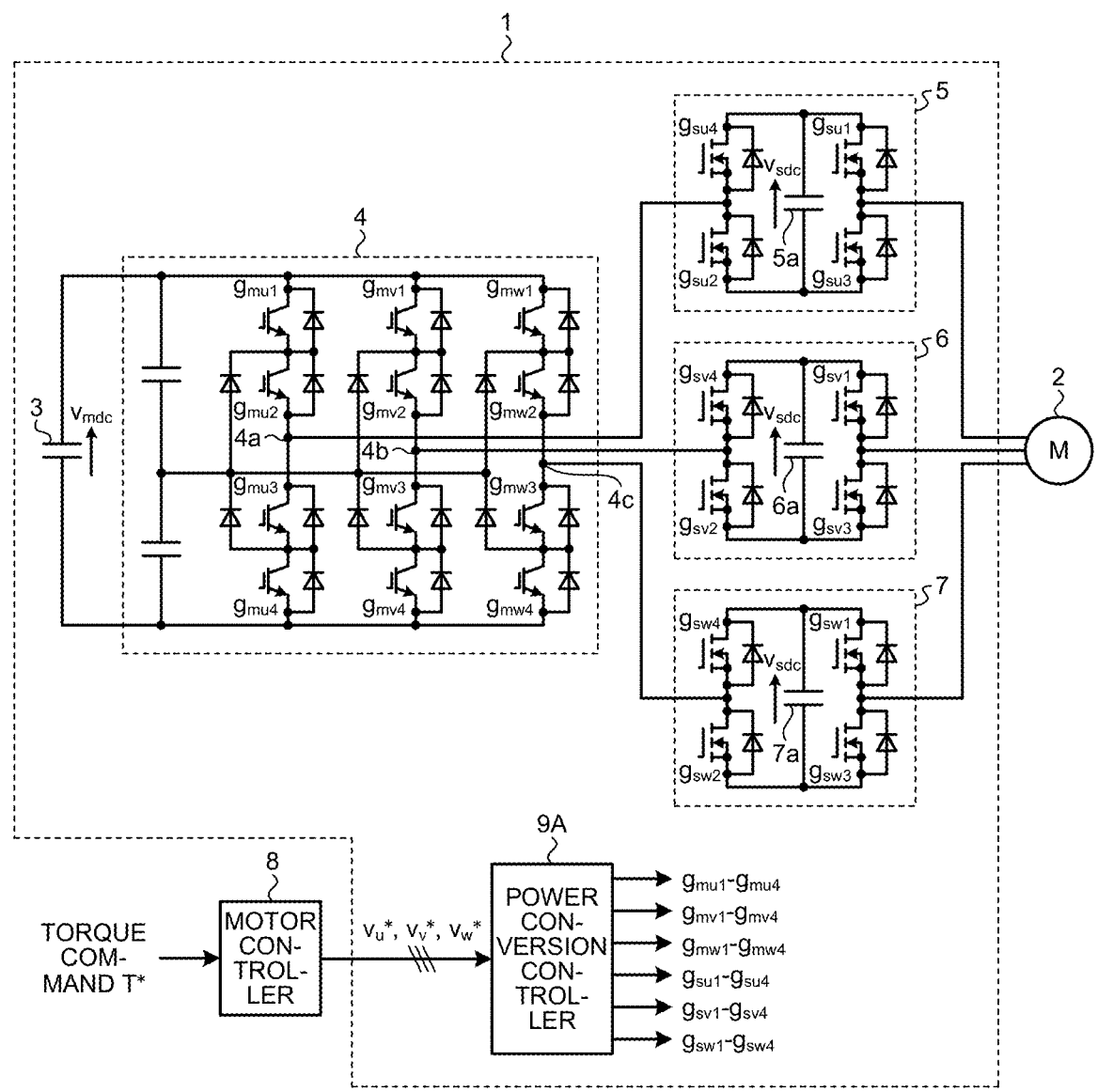
FIG. 1 is a circuit diagram illustrating a configuration of a power conversion device according to a first embodiment.

FIG. 1 is a circuit diagram illustrating a configuration of a power conversion device according to a first embodiment. A power conversion device 1 according to the first embodiment is a power conversion device that converts direct current (DC) power output from a DC power supply 3 into alternating current (AC) power for a motor 2, which is a load, and supplies the AC power to the motor 2. As illustrated in FIG. 1, the power conversion device 1 includes a three-phase three-level inverter 4, single-phase inverters 5, 6, and 7, and a power conversion controller 9A functioning as a controller. The three-phase three-level inverter 4 is connected between the positive and negative terminals of the DC power supply 3. The single-phase inverters 5, 6, and 7 are respectively connected between AC terminals 4a, 4b, and 4c of the respective phases different from one another, of the three-phase three-level inverter 4, and the respective phases of the motor 2.

A torque command T* is input to a motor controller 8. The motor controller 8 computes sinusoidal phase voltage commands $v_u^*$, $v_v^*$, and $v_w^*$, which cause the torque generated in the motor 2 to have a desired torque value that is based on the torque command T*, and outputs the sinusoidal phase voltage commands $v_u^*$, $v_v^*$, and $v_w^*$ to the power conversion controller 9A. The power conversion controller 9A generates gate signals $g_{mu1}$ to $g_{mu4}$, $g_{mv1}$ to $g_{mv4}$, $g_{mw1}$ to $g_{mw4}$, $g_{su1}$ to $g_{su4}$, $g_{sv1}$ to $g_{sv4}$, and $g_{sw1}$ to $g_{sw4}$ for controlling switching of the semiconductor elements in the three-phase three-level inverter 4 and switching of the semiconductor elements in the single-phase inverters 5, 6, and 7 such that voltages based on the sinusoidal phase voltage commands $v_u^*$, $v_v^*$, and $v_w^*$ are applied to the motor 2. The notation of gate signals $g_{mu1}$ to $g_{mu4}$ is an abbreviated expression of four gate signals $g_{mu1}$, $g_{mu2}$, $g_{mu3}$, and $g_{mu4}$. A similar notation also applies to other cases.

The gate signals $g_{mu1}$ to $g_{mu4}$, $g_{mv1}$ to $g_{mv4}$, and $g_{mw1}$ to $g_{mw4}$ are gate signals applied to the gates of the semiconductor elements in the three-phase three-level inverter 4. Specifically, the gate signal $g_{mu1}$ is a gate signal applied to a first semiconductor element of a first phase (e.g., phase U); the gate signal $g_{mu2}$ is a gate signal applied to a second semiconductor element of the first phase; the gate signal $g_{mu3}$ is a gate signal applied to a third semiconductor element of the first phase; and the gate signal $g_{mu4}$ is a gate signal applied to a fourth semiconductor element of the first phase. The first through fourth semiconductor elements are connected in series with one another. Both ends of the group of the four semiconductor elements connected in series with one another are electrically connected to the positive and negative terminals of the DC power supply 3. The groups of the semiconductor elements of the other phases are also connected similarly.

In addition, the gate signal $g_{mv1}$ is a gate signal applied to a first semiconductor element of a second phase (e.g., phase V); the gate signal $g_{mv2}$ is a gate signal applied to a second semiconductor element of the second phase; the gate signal $g_{mv3}$ is a gate signal applied to a third semiconductor element of the second phase; and the gate signal $g_{mv4}$ is a gate signal applied to a fourth semiconductor element of the second phase.

Moreover, the gate signal $g_{mw1}$ is a gate signal applied to a first semiconductor element of a third phase (e.g., phase W); the gate signal $g_{mw2}$ is a gate signal applied to a second semiconductor element of the third phase; the gate signal $g_{mw3}$ is a gate signal applied to a third semiconductor element of the third phase; and the gate signal $g_{mw4}$ is a gate signal applied to a fourth semiconductor element of the third phase.

In addition, the gate signals $g_{su1}$ to $g_{su4}$ are gate signals applied to the gates of the semiconductor elements in the single-phase inverter 5. Specifically, the gate signal $g_{su1}$ is a gate signal applied to a first semiconductor element placed at a higher potential in a first leg; the gate signal $g_{su2}$ is a gate signal applied to a second semiconductor element at a lower potential in a second leg; the gate signal $g_{su3}$ is a gate signal applied to a third semiconductor element at a lower potential in the first leg; and the gate signal $g_{su4}$ is a gate signal applied to a fourth semiconductor element at a higher potential in the second leg. The first and third semiconductor elements are connected in series with each other in this order to form the first leg, and both ends of the first leg are electrically connected to both ends of a capacitor 5a. Similarly, the fourth and second semiconductor elements are connected in series with each other in this order to form the second leg, and both ends of the second leg are electrically connected to both ends of the capacitor 5a.

Moreover, the gate signals $g_{sv1}$ to $g_{sv4}$ are gate signals applied to the gates of the semiconductor elements in the single-phase inverter 6. Specifically, the gate signal $g_{sv1}$ is a gate signal applied to a first semiconductor element placed at a higher potential in a first leg; the gate signal $g_{sv2}$ is a gate signal applied to a second semiconductor element at a lower potential in a second leg; the gate signal $g_{sv3}$ is a gate signal applied to a third semiconductor element at a lower potential in the first leg; and the gate signal $g_{sv4}$ is a gate signal applied to a fourth semiconductor element at a higher potential in the second leg. The first and third semiconductor elements are connected in series with each other in this order to form the first leg, and both ends of the first leg are electrically connected to both ends of a capacitor 6a. Similarly, the fourth and second semiconductor elements are connected in series with each other in this order to form the second leg, and both ends of the second leg are electrically connected to both ends of the capacitor 6a.

Furthermore, the gate signals $g_{sw1}$ to $g_{sw4}$ are gate signals applied to the gates of the semiconductor elements in the single-phase inverter 7. Specifically, the gate signal $g_{sw1}$ is a gate signal applied to a first semiconductor element placed at a higher potential in a first leg; the gate signal $g_{sw2}$ is a gate signal applied to a second semiconductor element at a lower potential in a second leg; the gate signal $g_{sw3}$ is a gate signal applied to a third semiconductor element at a lower potential in the first leg; and the gate signal $g_{sw4}$ is a gate signal applied to a fourth semiconductor element at a higher potential in the second leg. The first and third semiconductor elements are connected in series with each other in this order to form the first leg, and both ends of the first leg are electrically connected to both ends of a capacitor 7a. Similarly, the fourth and second semiconductor elements are connected in series with each other in this order to form the second leg, and both ends of the second leg are electrically connected to both ends of the capacitor 7a.

In the configuration of FIG. 1, the voltage applied to the motor 2 is a positive or negative DC voltage obtained by combining the DC voltage from the DC power supply 3 and the DC-side capacitor voltage of the single-phase inverters 5, 6, and 7 as appropriate and performing addition or subtraction taking into account the combination and polarity. The DC-side capacitor voltage is the voltage of the capacitors 5a, 6a, and 7a. The DC voltage from the DC power supply 3 is herein designated as "$v_{mdc}$", and the absolute value of the DC-side capacitor voltage of the single-phase inverters 5, 6, and 7 is herein designated as "$v_{sdc}$". Note that the direction of the arrow placed adjacent to each of the symbol $v_{mdc}$ and the symbol $v_{sdc}$ indicates the polarity. In addition, the first embodiment assumes that the absolute value $v_{sdc}$ of the DC-side capacitor voltage of the single-phase inverters 5, 6, and 7 is maintained at the phase voltage step size of the three-phase three-level inverter, that is, about ½ of half of the voltage from the DC power supply 3.

It is known that, when the output voltages of the single-phase inverters 5, 6, and 7 are connected in series with one another in the configuration of the first embodiment, use of a phase voltage step size, i.e., use of DC voltages having values, different by twice from another in the single-phase inverters 5, 6, and 7 allows a more regular sinusoidal output voltage to be obtained. For further details, see Masaki Yamada et al., "Development of a New Voltage Sag Compensator with a Gradationally Controlled Voltage Inverter", IEEJ Transactions on Industry Applications, Vol. 127-D, Issue 4, pp. 451-456 (2007) (original in Japanese).

Figure 2:
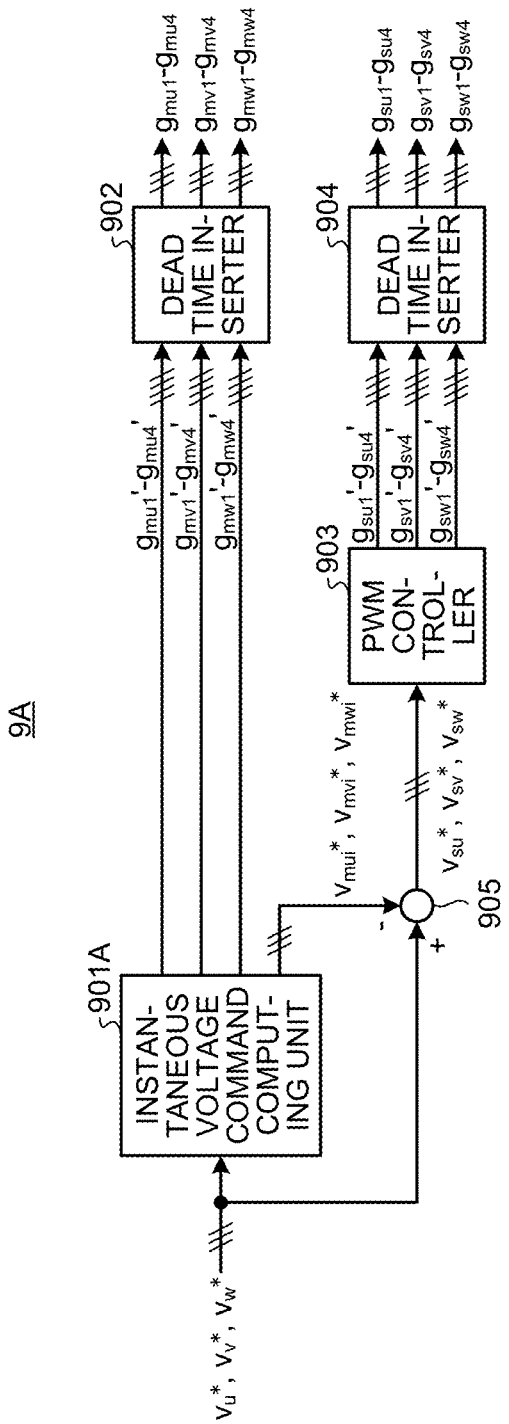
FIG. 2 is a block diagram illustrating a configuration of the power conversion controller in the first embodiment.

FIG. 2 is a block diagram illustrating a configuration of the power conversion controller 9A in the first embodiment. As illustrated in FIG. 2, the power conversion controller 9A in the first embodiment includes an instantaneous voltage command computing unit 901A, dead time inserters 902 and 904, a pulse width modulation (PWM) controller 903, and a subtractor 905.

Figure 3:
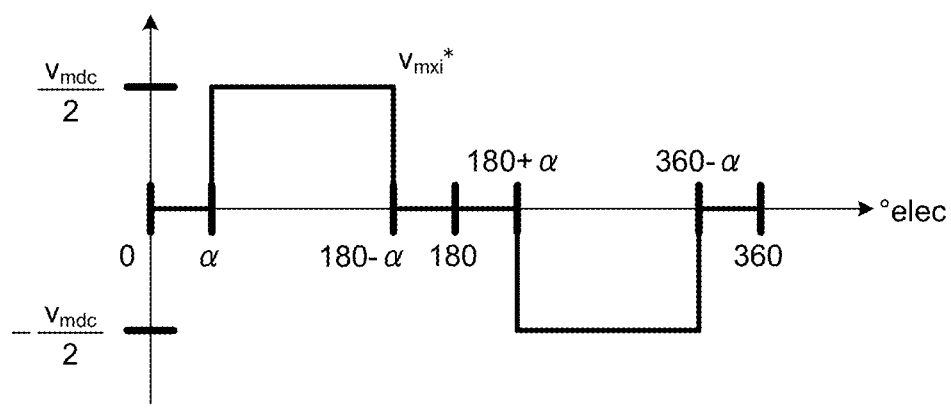
FIG. 3 is a diagram illustrating an example waveform of one phase of the instantaneous voltage commands generated by the instantaneous voltage command computing unit of FIG. 2.

The instantaneous voltage command computing unit 901A computes instantaneous voltage commands $v_{mui}^*$, $v_{mvi}^*$ and $v_{mwi}^*$ to be indicated, or directed, to the three-phase three-level inverter 4. The waveform of one phase of the instantaneous voltage commands $v_{mui}^*$, $v_{mvi}^*$, and $v_{mwi}^*$ is illustrated in FIG. 3. FIG. 3 is a diagram illustrating an example waveform of one phase of the instantaneous voltage commands generated by the instantaneous voltage command computing unit 901A of FIG. 2.

The voltage waveform illustrated in FIG. 3 is a single pulse voltage having an absolute value that is ½ of the DC voltage $v_{mdc}$ from the DC power supply 3, and having a portion of a positive voltage polarity and a portion of a negative voltage polarity each being repeated once during a fundamental wave period of the sinusoidal phase voltage commands $v_u^*$, $v_v^*$, and $v_w^*$. The fundamental wave period is a time period corresponding to the range from 0° elec. to 360° elec. in the diagram. The use of a single pulse voltage can reduce the number of times of switching of the inverter. This reduces switching loss, and enables the inverter to have a higher efficiency.

FIG. 3 indicates the instantaneous voltage command as $v_{mxi}^*$. The index x in this notation represents one phase of the phases u, v, and w. Note that the sinusoidal phase voltage commands may also be expressed using a similar notation as appropriate. In addition, the horizontal axis of FIG. 3 represents the phase of the sinusoidal phase voltage command $v_x^*$ in units of electrical degrees (° elec.).

The single pulse voltage representing the instantaneous voltage command $v_{mxi}^*$ has, as illustrated in FIG. 3, a voltage waveform that changes based on the phase and on the phase angle a of the sinusoidal phase voltage command $v_x^*$. The phase angle a will be described later in more detail. Note that the phase angle a may also be referred to herein as "first phase angle".

Specifically, in the example of FIG. 3, the single pulse voltage has a value changing such that the value is a zero value at a phase of zero, changes to a positive value at a phase α, returns to the zero value at a phase 180−α, changes to a negative value at a phase 180+α, and returns to the zero value at a phase 360−α. In other words, using the unit of radian instead of electrical degree, the value of the single pulse voltage is a zero value at a phase ranging from zero to α, from π−α to π+α, and from 2π−α to 2π, is a positive value at a phase ranging from α to π−α, and is a negative value at a phase ranging from π+α to 2π−α. Note that the term zero value as used herein does not mean completely zero, but may include a near-zero value. That is, the term zero value as used herein is a concept including a value deemed to be zero.

At this stage, to make the fundamental wave components of both the sinusoidal phase voltage command $v_x^*$ and the instantaneous voltage command $v_{mxi}^*$ equal to each other, the foregoing phase angle α is determined using the following equation, where $v_{php}$ represents the amplitude of the sinusoidal phase voltage command $v_x^*$.

[Formula 1]

$$\alpha = \cos^{-1}\left(v_{php}\frac{\pi}{2v_{mdc}}\right) \quad (1)$$

Determination made according to Equation (1) above means that the three-phase three-level inverter 4 outputs the voltage of the fundamental wave component, and such voltage covers all the power of the fundamental wave component supplied to the motor 2. Determination made in this manner eliminates the need for a DC power supply on the DC side of the single-phase inverters 5, 6, and 7, which allows size reduction and cost reduction of the power conversion device 1. In this case, a capacitor is connected on the DC side to smooth the voltage. The foregoing capacitors 5a, 6a, and 7a are such capacitors.

In addition, in normal operation, the command value of the DC-side capacitor voltage of the single-phase inverters 5, 6, and 7 is maintained at about ½ of half of the voltage from the DC power supply 3 in the three-phase three-level inverter 4. When turbulence has occurred and the turbulence has caused the DC-side capacitor voltage of the single-phase inverters 5, 6, and 7 to exceed the command value, the proportion of the three-phase three-level inverter 4 is reduced, and the proportion of the single-phase inverters 5, 6, and 7 is increased. This can reduce the variation in the DC voltage. In contrast, when the DC-side capacitor voltage of the single-phase inverters 5, 6, and 7 has fallen below the command value, the proportion of the three-phase three-level inverter 4 is increased to reduce the proportion of the single-phase inverters 5, 6, and 7. This allows the DC-side capacitor voltage of the single-phase inverters 5, 6, and 7 to be maintained at the command value.

Returning to the description with reference to FIG. 2, the instantaneous voltage command computing unit 901A generates gate signals $g_{mu1}'$ to $g_{mu4}'$, $g_{mv1}'$ to $g_{mv4}'$, and $g_{mw1}'$ to $g_{mw4}'$ for outputting of voltages that are based on the instantaneous voltage commands $v_{mui}^*$, $v_{mvi}^*$, and $v_{mwi}^*$, in addition to the generation of the instantaneous voltage commands $v_{mui}^*$, $v_{mvi}^*$, and $v_{mwi}^*$. Note that no dead time is yet inserted at this stage for preventing an arm short circuit from occurring in the three-phase three-level inverter 4.

Table 1 below illustrates the relationships between the gate signals for the three-phase three-level inverter 4 and the value of the instantaneous voltage command $v_{mxi}^*$ to be indicated to the three-phase three-level inverter 4. The instantaneous voltage command computing unit 901A generates the gate signals for the three-phase three-level inverter 4 using the relationships of Table 1.

TABLE 1

| Instantaneous voltage command $V_{mxi}$ | $-V_{mdc}/2$ | 0 | $V_{mdc}/2$ |
|---|---|---|---|
| $g_{mx1}$ | L | L | H |
| $g_{mx2}$ | L | H | H |
| $g_{mx3}$ | H | H | L |
| $g_{mx4}$ | H | L | L |

Figure 4:
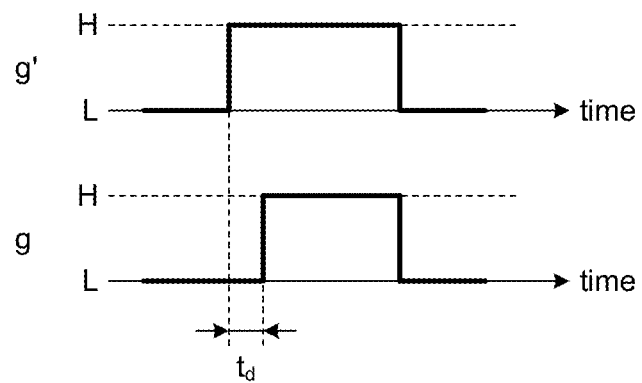
FIG. 4 is a diagram illustrating a method of inserting a dead time used in the dead time inserter of the first embodiment.

The dead time inserter 902 inserts a dead time in the gate signals $g_{mu1}'$ to $g_{mu4}'$, $g_{mv1}'$ to $g_{mv4}'$, and $g_{mw1}'$ to $g_{mw4}'$ to generate new gate signals $g_{mu1}$ to $g_{mu4}$, $g_{mv1}$ to $g_{mv4}$, and $g_{mw1}$ to $g_{mw4}$. FIG. 4 illustrates a method of inserting a dead time. FIG. 4 is a diagram illustrating a method of inserting a dead time used in the dead time inserter 902 of the first embodiment.

In FIG. 4, the waveform indicated by g' in the upper part represents a gate signal before a dead time insertion, and the waveform indicated by g in the lower part represents a gate signal after the insertion. Note that the symbol H herein denotes high, and the symbol L herein denotes low. In addition, as illustrated in FIG. 4, a dead time is herein inserted at timing when the gate signal transitions from L to H to cause a delay of a dead time $t_d$. A similar method is applied in the other embodiments.

The subtractor 905 subtracts the instantaneous voltage commands $v_{mui}^*$, $v_{mvi}^*$, and $v_{mwi}^*$ to be indicated to the three-phase three-level inverter 4 from the respective sinusoidal phase voltage commands $v_u^*$, $v_v^*$, and $v_w^*$ to generate mean voltage commands $v_{su}^*$, $v_{sv}^*$, and $v_{sw}^*$ to be indicated to the single-phase inverters 5, 6, and 7. This subtraction operation is performed such that the mean voltage commands $v_{su}^*$, $v_{sv}^*$, and $v_{sw}^*$ for the single-phase inverters 5, 6, and 7 are computed to cancel the common mode voltage of the three-phase three-level inverter 4. Specifically, a common voltage component is superimposed on the three-phase mean voltage commands to make the sum of the mean voltage commands negative (i.e., a non-positive value) when the sum of the instantaneous voltage commands is positive, and to make the sum of the mean voltage commands positive (i.e., a non-negative value) when the sum of the instantaneous voltage commands is negative. Reduction or elimination of the common mode voltage as describe above can reduce common mode noise generated due to the common mode voltage. The common mode voltage will be described later herein. The PWM controller 903 generates gate signals $g_{su1}'$ to $g_{su4}'$, $g_{sv1}'$ to $g_{sv4}'$, and $g_{sw1}'$ to $g_{sw4}'$ for the single-phase inverters 5, 6, and 7 before a dead time insertion to cause voltages based on these mean voltage commands $v_{su}^*$, $v_{sv}^*$, and $v_{sw}^*$ to be output.

Figure 5:
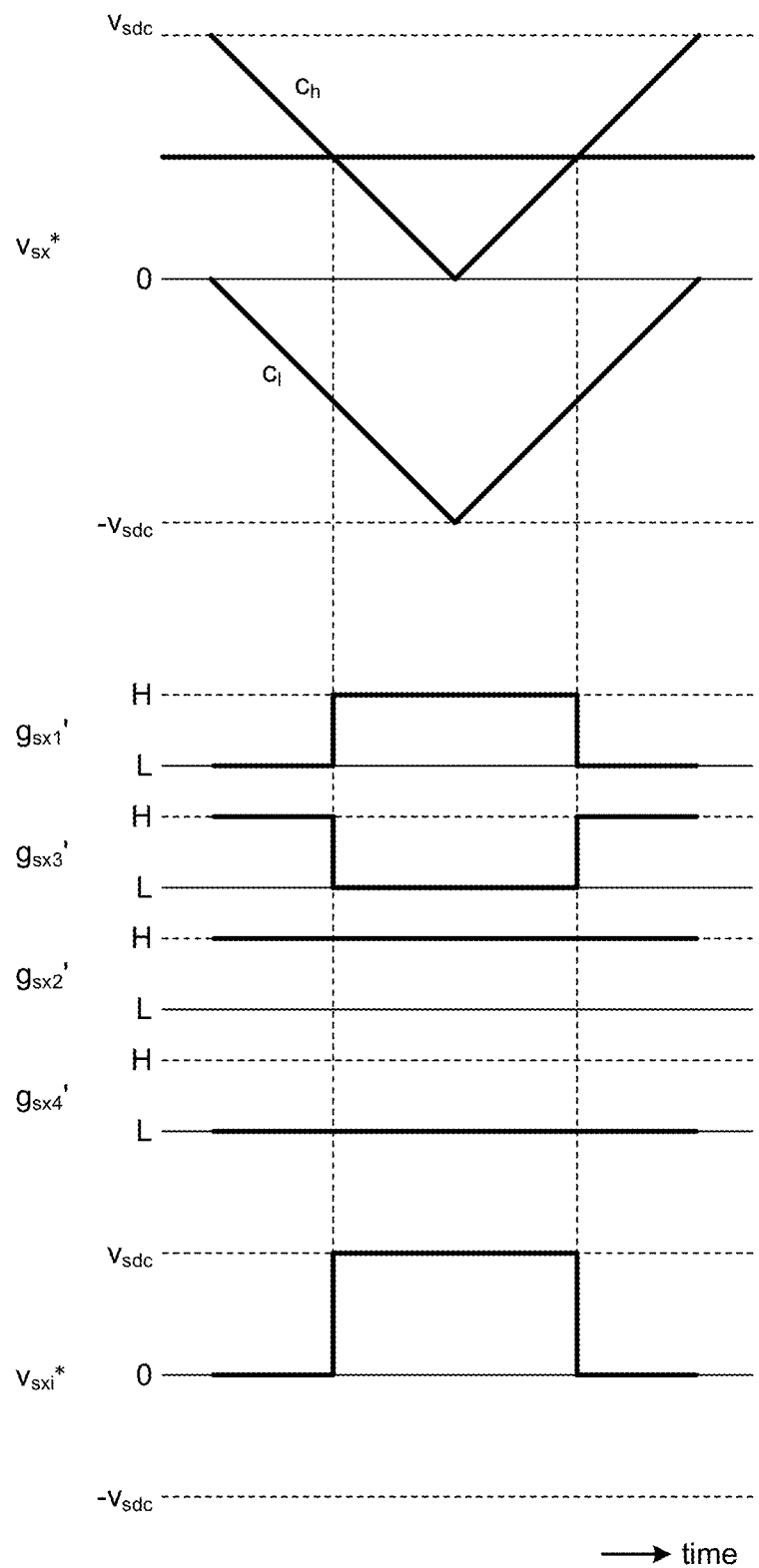
FIG. 5 is a first diagram for describing operation performed in the PWM controller of the first embodiment.
Figure 6:
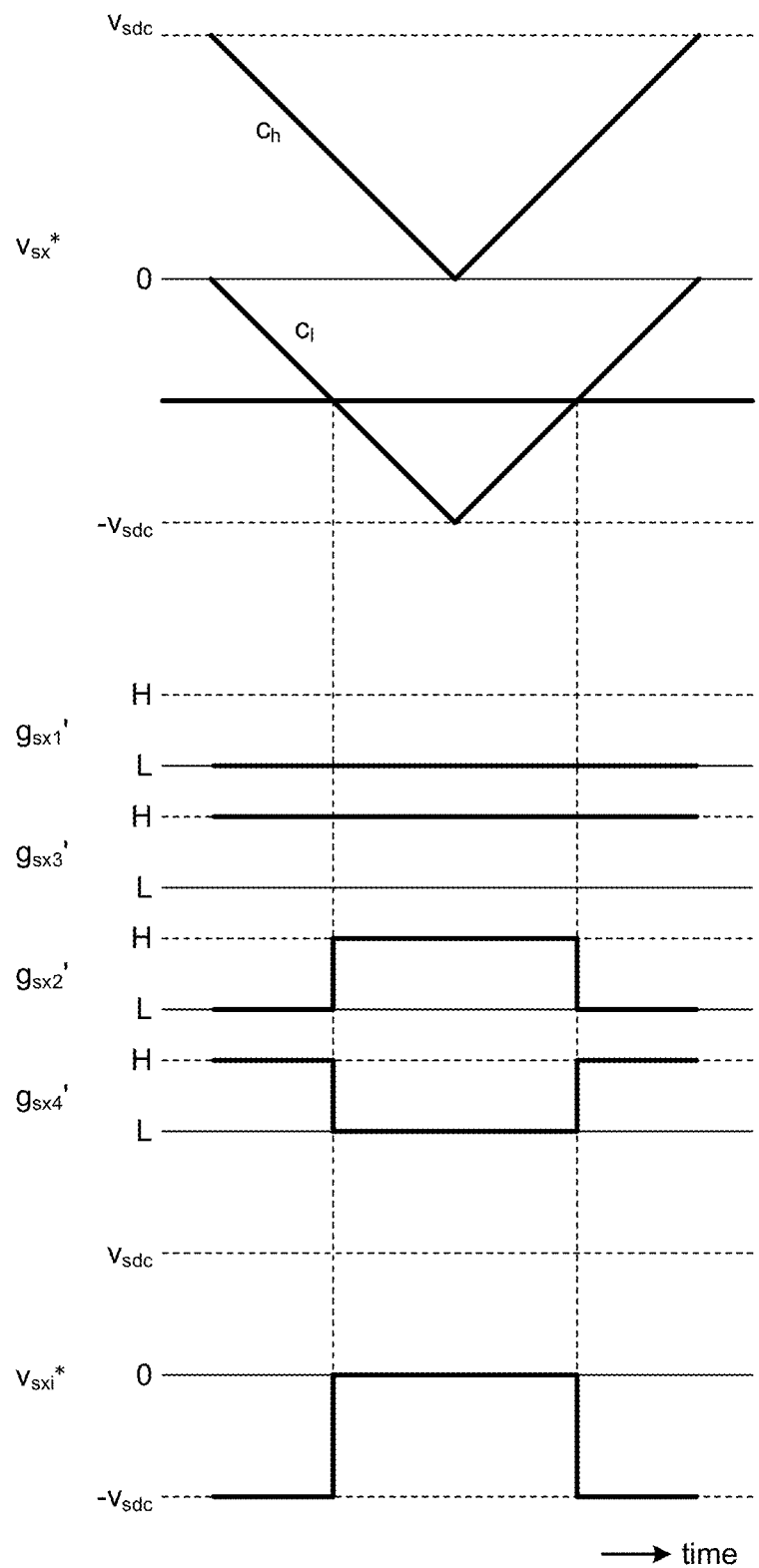
FIG. 6 is a second diagram for describing operation performed in the PWM controller of the first embodiment.

FIG. 5 is a first diagram for describing operation performed in the PWM controller 903 of the first embodiment. FIG. 6 is a second diagram for describing operation performed in the PWM controller 903 of the first embodiment. The horizontal axes of FIGS. 5 and 6 represent time. In addition, FIGS. 5 and 6 illustrate, from top to bottom, signals of the mean voltage command $v_{sx}^*$, of the gate signals $g_{sx1}'$, a $g_{sx3}'$, $g_{sx2}'$, and $g_{sx4}'$, and of single-phase voltage command $v_{sxi}^*$ each using a bold line. The top part illustrating the mean voltage command $v_{sx}^*$ also illustrates the waveforms of an upper carrier signal $c_h$ and of a lower carrier signal $c_l$ each using a bold line. The upper carrier signal $c_h$ and the lower carrier signal $c_l$ have the same period. The period of the upper carrier signal $c_h$ and of the lower carrier signal $c_l$ is referred to as "carrier period".

The PWM controller 903 generates the gate signals $g_{sx1}'$ and $g_{sx3}'$ by comparing the value of the mean voltage command $v_{sx}^*$ with the value of the upper carrier signal $c_h$. In addition, the PWM controller 903 generates the gate signals $g_{sx2}'$ and $g_{sx4}'$ by comparing the value of the mean voltage command $v_{sx}^*$ with the value of the lower carrier signal $c_l$. The upper carrier signal $c_h$ is a triangular wave signal having a value that changes within a range from a zero voltage value to the maximum value $v_{sdc}$ of the voltages caused to be output by the single-phase inverters 5, 6, and 7. In addition, the lower carrier signal $c_l$ is a triangular wave signal having a value that changes within a range from the minimum value $-v_{sdc}$ of the voltages caused to be output by the single-phase inverters 5, 6, and 7 to the zero voltage value. Note that the maximum value of the voltages caused to be output by the single-phase inverters 5, 6, and 7 may be referred to herein as "first voltage", and the minimum value of the voltages caused to be output by the single-phase inverters 5, 6, and 7 may be referred to herein as "second voltage".

As illustrated in FIG. 5, the gate signal $g_{sx1}'$ is set to H level and the gate signal $g_{sx3}'$ is set to L level when $v_{sx}^* > c_h$, and the gate signal $g_{sx1}'$ is set to L level and the gate signal $g_{sx3}'$ is set to H level when $v_{sx}^* \leq c_h$. In addition, as illustrated in FIG. 6, the gate signal $g_{sx2}'$ is set to H level and the gate signal $g_{sx4}'$ is set to L level when $v_{sx}^* \geq c_l$, and the gate signal $g_{sx2}'$ is set to L level and the gate signal $g_{sx4}'$ is set to H level when $v_{sx}^* < c_l$. The single-phase voltage command $v_{sxi}^*$, which is an instantaneous value, is one illustrated in the bottom part of each of FIGS. 5 and 6. Note that a time-averaged value obtained by integration of the single-phase voltage command $v_{sxi}^*$ over one carrier period is the mean voltage command $v_{sx}^*$. That is, providing PWM control using the mean voltage command $v_{sx}^*$ enables voltages based on the mean voltage command $v_{sx}^*$, which is an average value, to be respectively output from the single-phase inverters 5, 6, and 7.

Table 2 below illustrates the relationships between the gate signals for the single-phase inverters 5, 6, and 7 and the single-phase voltage command $v_{sxi}^*$ to be indicated to the single-phase inverters 5, 6, and 7. The combination of the PWM controller 903 and the dead time inserter 904 inserts a dead time as described above referring to FIG. 4, and generates the gate signals for the single-phase inverters 5, 6, and 7 using the relationships of Table 2.

TABLE 2

| Single-phase voltage command $V_{SXi}$ | $-V_{sdc}$ | 0 | $V_{sdc}$ |
|---|---|---|---|
| $g_{sx1}$ | L | L | H |
| $g_{sx2}$ | L | H | H |
| $g_{sx3}$ | H | H | L |
| $g_{sx4}$ | H | L | L |

As described above, the first embodiment uses PWM control in which a voltage command is compared with the triangular wave to generate gate signals. In addition, in the first embodiment, the switching frequency of the single-phase inverters 5, 6, and 7 is higher than the switching frequency of the three-phase three-level inverter 4. The switching frequency of the single-phase inverters 5, 6, and 7 is the reciprocal of the carrier period. Thus, electrical power with reduced harmonic content can be supplied to the motor 2, which is the load, with reduced switching loss of the three-phase three-level inverter 4. In addition, in the first embodiment, the DC-side capacitor voltage of the single-phase inverters 5, 6, and 7 is maintained at the phase voltage step size of the three-phase three-level inverter 4, that is, about ½ of half of the voltage from the DC power supply 3. This enables a semiconductor element having a high switching frequency to be used in the single-phase inverters 5, 6, and 7, and also enables reduction in the switching loss.

Figure 7:
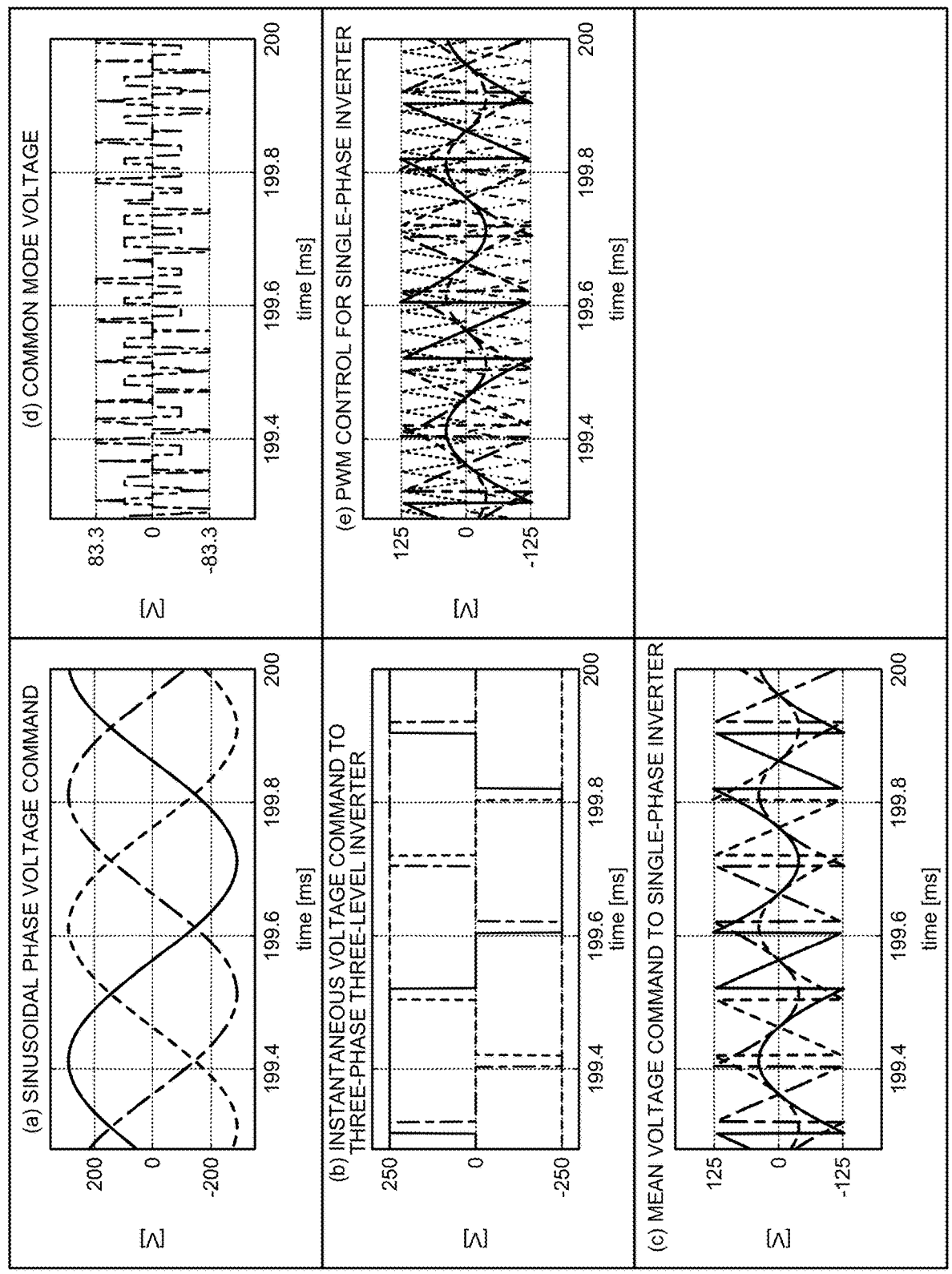
FIG. 7 is a diagram illustrating a set of operation waveforms of a main portion in a first operation performed in the power conversion device according to the first embodiment.
Figure 8:
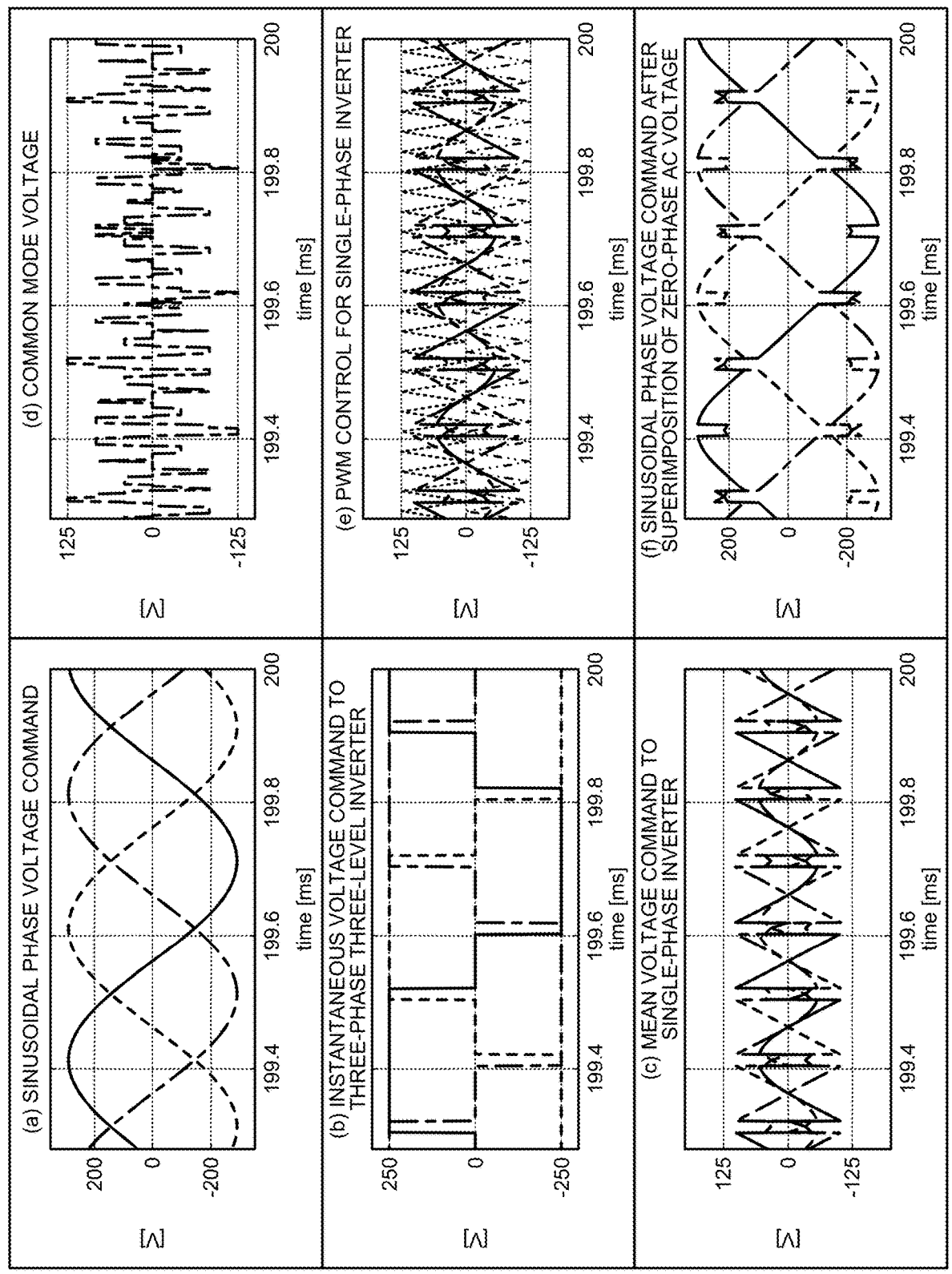
FIG. 8 is a diagram illustrating, as a comparative example, a set of operation waveforms of a main portion in the first operation performed in the power conversion device of Patent Literature 1.

FIG. 7 is a diagram illustrating a set of operation waveforms of a main portion in a first operation performed in the power conversion device 1 according to the first embodiment. In addition, FIG. 8 is a diagram illustrating, as a comparative example, a set of operation waveforms of a main portion in the first operation performed in the power conversion device of the Patent Literature 1. Both diagrams assume that the DC voltage $v_{mdc}$ from the DC power supply 3 is 500 V, and that the absolute value $v_{sdc}$ of the DC-side capacitor voltage of the single-phase inverters 5, 6, and 7 is 125 V.

Note that the term first operation as used herein refers to an operation of the power conversion device 1 when the motor 2, which is the load, rotates at a high speed. That is, the operation waveforms of FIGS. 7 and 8 are those of an example when the rotational speed of the motor 2 is a high speed. Note that the expression "high speed" has a relative meaning, and thus means a higher speed than the speed in the example of FIG. 9 described later.

Note that, in the operation waveforms of FIGS. 7 and 8, part (a) illustrates the sinusoidal phase voltage commands for driving the motor. Part (b) illustrates the instantaneous voltage commands to the three-phase three-level inverter, and part (c) illustrates the mean voltage commands to the single-phase inverters. As described above, the instantaneous voltage commands and the mean voltage commands are each either one or the other of the voltage commands resulting from division of the sinusoidal phase voltage commands. Part (d) illustrates the common mode voltage. Part (e) illustrates the voltage waveforms from PWM control for the single-phase inverters. FIG. 8 further includes part (f) illustrating the waveforms of the sinusoidal phase voltage commands after superimposition of the zero-phase AC voltage.

The common mode voltage is a voltage that may cause common mode noise. Specifically, the common mode voltage has a value obtained by summation of the phase voltages of the three phases actually supplied to the motor 2, and then dividing the sum by the number of phases. A large variation in the common mode voltage will cause a zero-phase current to flow via the cable connecting together the single-phase inverters 5, 6, and 7 and the motor 2, or via stray capacitance of the motor 2. This may cause common mode noise, which has an adverse effect on a peripheral device, or may degrade the bearing of the motor 2. Therefore, the common mode voltage having smaller value and variation are preferable.

As described above, in the first embodiment, the mean voltage commands for the single-phase inverters 5, 6, and 7 have respective values obtained by subtraction of the instantaneous voltage commands for the three-phase three-level inverter 4 respectively from the sinusoidal phase voltage commands. This causes the mean voltage commands to be voltages that cancel the common mode voltage of the instantaneous voltage commands. Accordingly, the example of the first embodiment controls the peak value of pulsation of the common mode voltage within a range of ±83.3 V as illustrated in part (e) in FIG. 7.

In contrast, in the example of Patent Literature 1, the peak value of pulsation of the common mode voltage has a higher value of 125 V as illustrated in part in (d) in FIG. 8. The example of FIG. 8 illustrates operation waveforms under the same load condition when the zero-phase AC voltage is superimposed on the mean voltage commands for the single-phase inverters according to the aim described in the first embodiment of Patent Literature 1. The example of FIG. 8 has succeeded in reducing the peak value of the mean voltage commands for the single-phase inverters by superimposition of the zero-phase AC voltage. In this regard, the sum of each of the mean voltage commands for the single-phase inverters after superimposition of the zero-phase AC voltage and each of the instantaneous voltage commands for the three-phase three-level inverter is the corresponding one of the sinusoidal phase voltage commands after superimposition of the zero-phase AC voltage illustrated in part (f) in FIG. 8. In view of the waveforms illustrated in parts (d) and (f) in FIG. 8, it can be understood that superimposition of the zero-phase AC voltage, i.e., the AC common mode voltage, increases pulsation of the common mode voltage of the output voltage.

As described above, the technology of Patent Literature 1 reduces the peak value of the mean voltage commands for the single-phase inverters by superimposing the zero-phase AC voltage on the mean voltage commands for the single-phase inverters, but the superimposition of the zero-phase AC voltage increases pulsation of the common mode voltage of the output voltage. In contrast, in the first embodiment, the sinusoidal phase voltage commands are divided into the three-phase instantaneous voltage commands to be indicated to the three-phase three-level inverter 4, and the mean voltage commands to be indicated to the respective three single-phase inverters 5, 6, and 7. Considering, in particular, the three-phase instantaneous voltage commands after the division and the single-phase mean voltage commands after the division, there is a relationship that an increase in the former causes the latter to decrease, and a decrease in the former causes the latter to increase. Accordingly, in consideration of the operation in the configuration of the first embodiment of superimposing a common voltage component on each of the three mean voltage commands for the three single-phase inverters 5, 6, and 7, an idea arises of superimposing the voltage component to make the sum of the three mean voltage commands zero or a negative value, i.e., a non-positive value when the sum of the three-phase instantaneous voltage commands is a positive value; or alternatively, an idea arises of superimposing the common voltage component on each of the three mean voltage commands to make the sum of the three mean voltage commands zero or a positive value, i.e., a non-negative value when the sum of the three-phase instantaneous voltage commands is a negative value. Note that a specific example of superposing a common voltage component will be described in the second embodiment or a later section described later.

The power conversion device of the first embodiment is capable of reducing pulsation of the common mode voltage. This enables size reduction and weight reduction of the EMI filter for reducing common mode noise. This can reduce common mode noise while avoiding an increase in the device size.

Note that the use of the technique of Patent Literature 1 can reduce the peak value of the mean voltage commands for the single-phase inverters more than in the first embodiment, thereby enabling the DC-side capacitor voltage of the single-phase inverters to be reduced. However, to achieve a smooth output voltage, the DC-side capacitor voltage value of the single-phase inverters is typically set to a fraction of the DC-side capacitor voltage value of the three-phase three-level inverter. That is, because the original DC voltage value of the single-phase inverters is small, further reduction in the DC-side capacitor voltage value of the single-phase inverters is not so advantageous.

Second Embodiment

Figure 9:
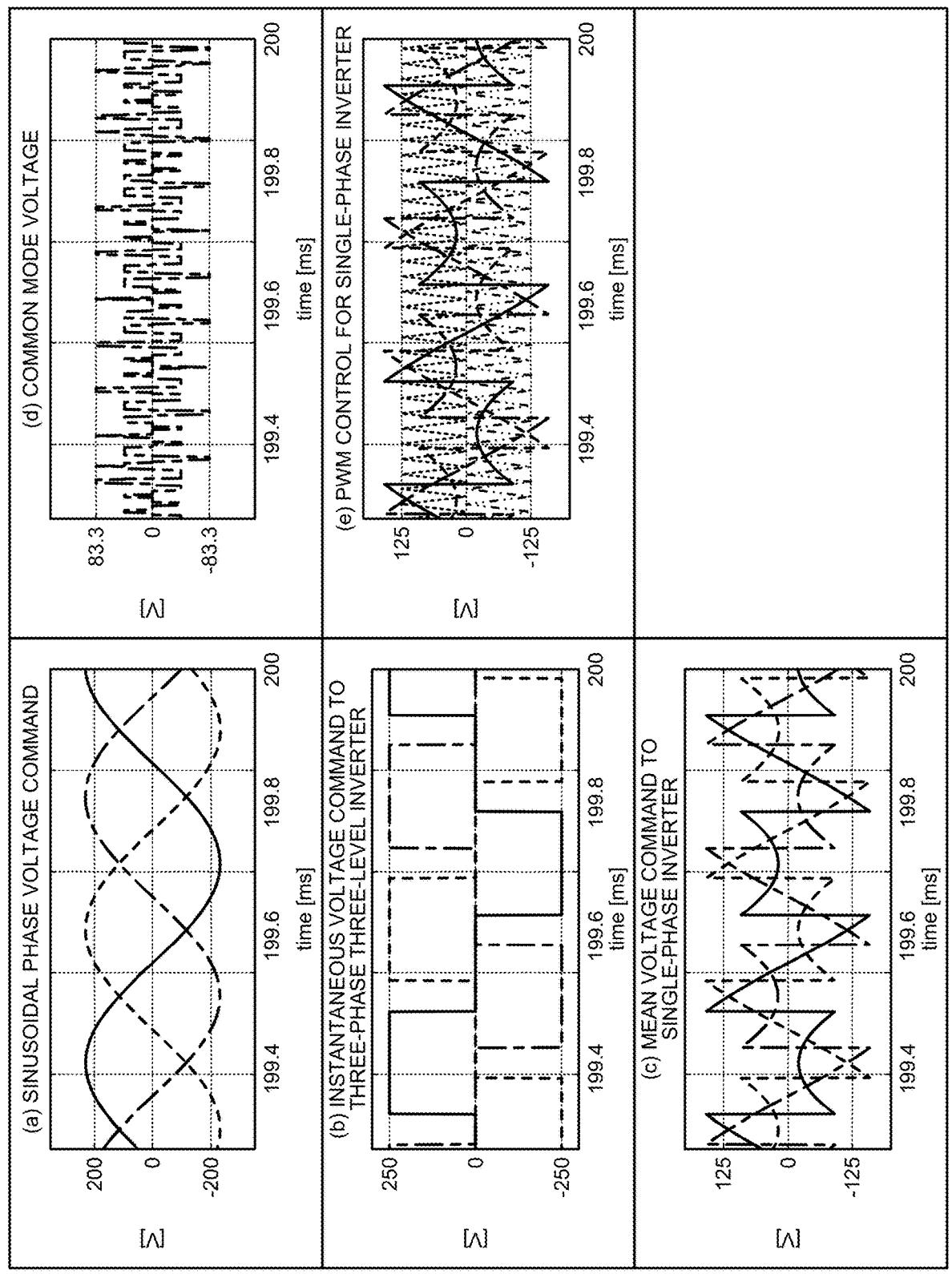
FIG. 9 is a diagram illustrating a set of operation waveforms of a main portion in a second operation performed in the power conversion device according to the first embodiment.

Before describing a configuration and an operation of a second embodiment, an issue to be solved in the second embodiment will be described using the example operation of the first embodiment. FIG. 9 is a diagram illustrating a set of operation waveforms of a main portion in a second operation performed in the power conversion device 1 according to the first embodiment. The term second operation as used herein refers to an operation of the power conversion device 1 according to the first embodiment when the motor 2, which is the load, rotates at a middle speed. That is, the operation waveforms of FIG. 9 are those of an example when the rotational speed of the motor 2 is a middle speed. Note that the example operation waveforms of interest are the same as those of the case of FIG. 7.

In the case of middle speed rotation, as can be seen by comparison between FIG. 7 and FIG. 9, the amplitude of the sinusoidal phase voltage commands is reduced, and the pulse width of the instantaneous value voltages of the three-phase three-level inverter 4 is also reduced. The mean voltage commands for the single-phase inverters 5, 6, and 7 exceed 125 V, which is the highest voltage value that can be output, and −125 V, which is the lowest voltage value that can be output, indicating that overmodulation is caused. This increases harmonic content of the voltage supplied to the motor 2, and also increases the loss accordingly. Thus, the second embodiment will be described in the context of a power conversion device capable of avoiding overmodulation even when the voltage of the load drops.

Figure 10:
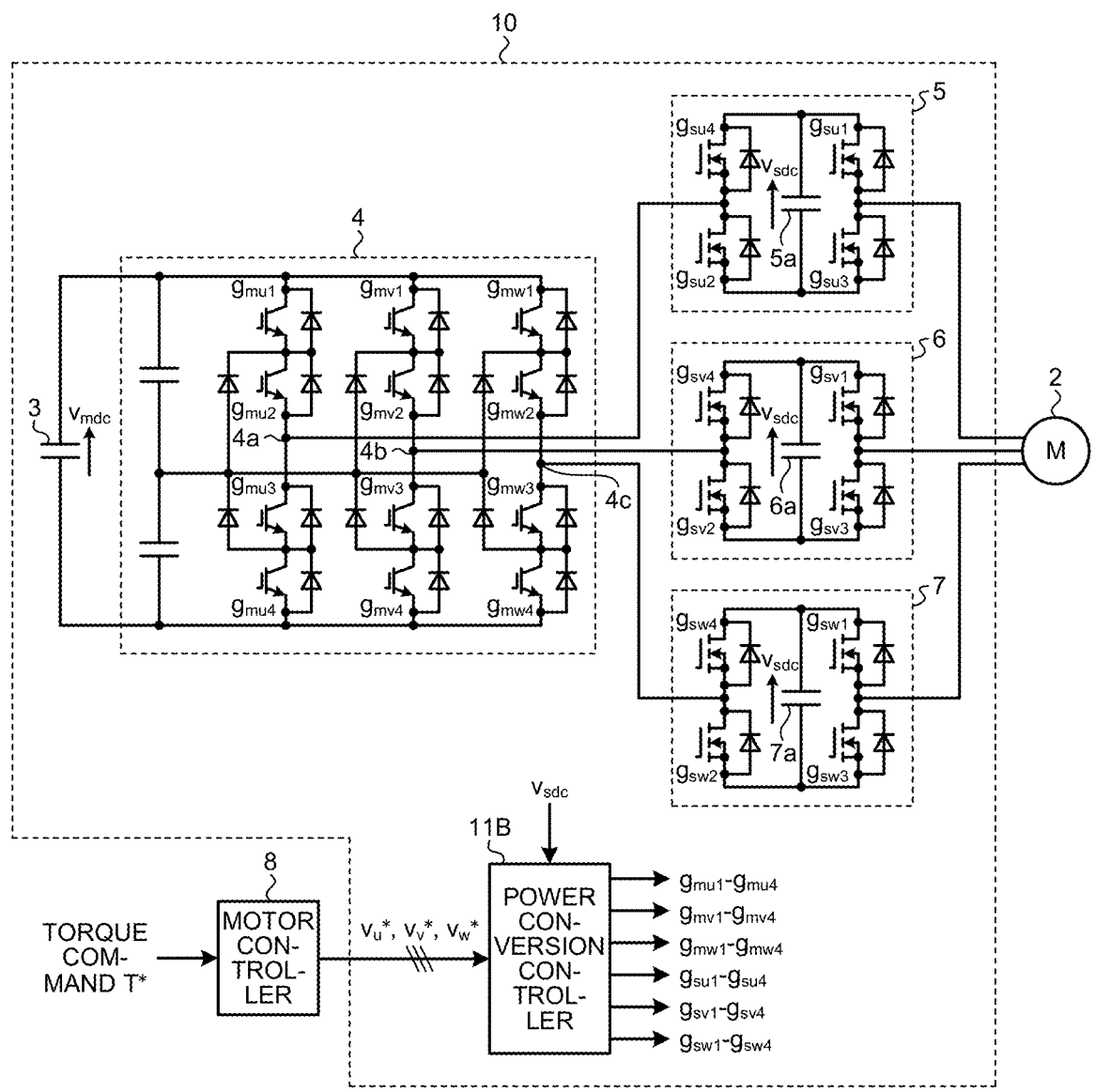
FIG. 10 is a circuit diagram illustrating a configuration of a power conversion device according to a second embodiment.

FIG. 10 is a circuit diagram illustrating a configuration of a power conversion device according to the second embodiment. In FIG. 10, a power conversion device 10 according to the second embodiment is configured similarly to the power conversion device 1 according to the first embodiment illustrated in FIG. 1, but includes a power conversion controller 11B in place of the power conversion controller 9A. Note that the other part of the configuration is the same as or equivalent to the corresponding part of the configuration of the first embodiment. Identical or equivalent components are designated by like reference characters, and duplicate description thereof will be omitted.

Figure 11:
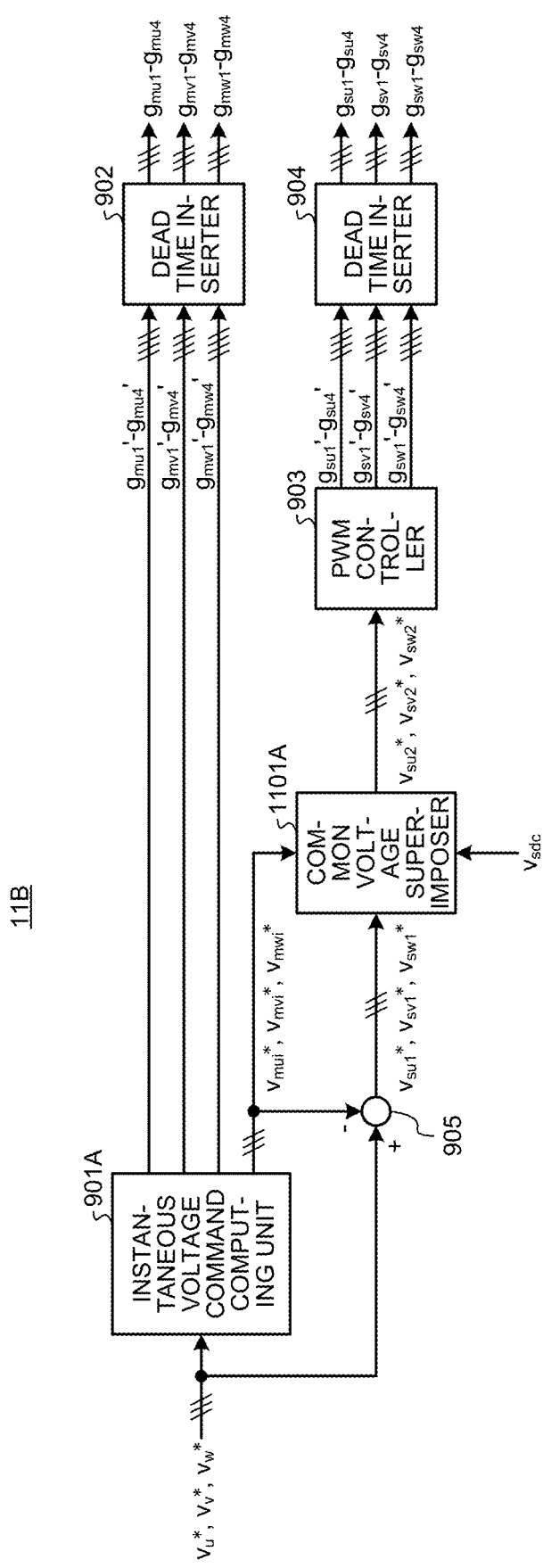
FIG. 11 is a block diagram illustrating a configuration of the power conversion controller in the second embodiment.

FIG. 11 is a block diagram illustrating a configuration of the power conversion controller 11B in the second embodiment. In FIG. 11, the power conversion controller 11B in the second embodiment is configured similarly to the power conversion controller 9A in the first embodiment illustrated in FIG. 2, but a common voltage superimposer 1101A is added between the subtractor 905 and the PWM controller 903. The common voltage superimposer 1101A receives the instantaneous voltage commands $v_{mui}^*$, $v_{mvi}^*$, and $v_{mwi}^*$, which are the outputs from the instantaneous voltage command computing unit 901A, mean voltage commands $v_{su1}^*$, $v_{sv1}^*$, and $v_{sw1}^*$, which are the outputs from the subtractor 905, and the absolute value $v_{sdc}$ of the DC-side capacitor voltage of the single-phase inverters 5, 6, and 7. The common voltage superimposer 1101A makes a correction by superimposing the common voltage component based on these input signals to prevent the mean voltage commands $v_{su1}^*$, $v_{sv1}^*$, and $v_{sw1}^*$ to be respectively indicated to the three single-phase inverters 5, 6, and 7 from exceeding the maximum value that can be output and the minimum value that can be output. Mean voltage commands $v_{su2}^*$, $v_{sv2}^*$, and $v_{sw2}^*$ resulting from the correction are the input signals to the PWM controller 903. The other part of the configuration is the same as or equivalent to the corresponding part of the configuration of the first embodiment. Identical or equivalent components are designated by like reference characters, and duplicate description thereof will be omitted.

Figure 12:
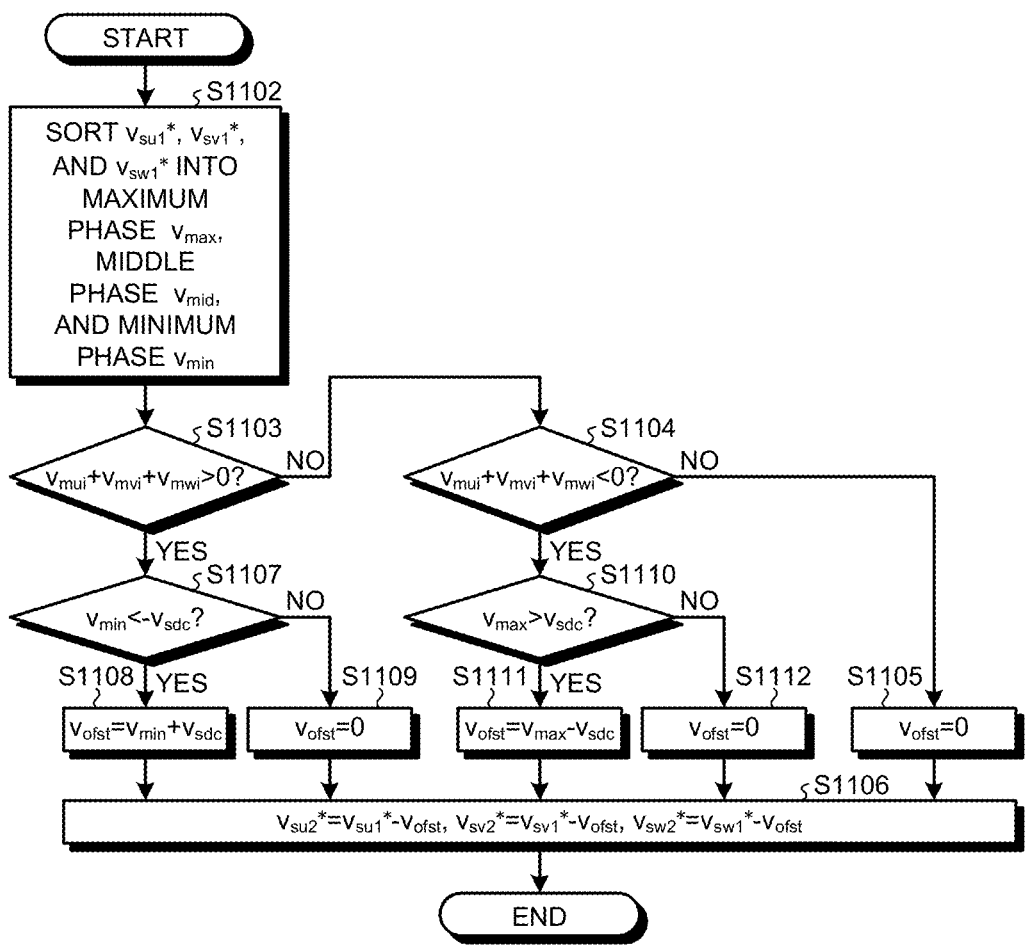
FIG. 12 is a diagram illustrating, using a flowchart, an example of algorithm performed by the common voltage superimposer of the second embodiment.

An example of algorithm performed by the common voltage superimposer 1101A will next be described with reference to FIG. 12. FIG. 12 is a diagram illustrating, using a flowchart, an example of algorithm performed by the common voltage superimposer 1101A of the second embodiment.

First, the three mean voltage commands $v_{su1}^*$, $v_{sv1}^*$, and $v_{sw1}^*$ to be indicated to the single-phase inverters 5, 6, and 7 are sorted by the values thereof into a maximum phase $v_{max}$, a middle phase $v_{mid}$, and a minimum phase $v_{min}$ (step S1102). Note that the maximum phase $v_{max}$ may be referred to herein as "first mean voltage command", the middle phase $v_{mid}$ may be referred to herein as third mean voltage command", and the minimum phase $v_{min}$ may be referred to herein as second mean voltage command".

Next, it is determined whether the common mode voltage of the instantaneous voltage commands for the three-phase three-level inverter 4 is positive or not (step S1103). As described above, the common mode voltage has a value obtained by summation of the phase voltages of the three phases actually supplied to the motor 2, and then dividing the sum by the number of phases. Note, however, that this determination operation only needs information as to whether the value of the common mode voltage is positive or negative. Therefore, the sum of the phase voltages of the three phases, i.e., $v_{mu1}+v_{mv1}+v_{mw1}$, is used as the discrimination formula. If the common mode voltage is not a positive value (No at step S1103), it is further determined whether the common mode voltage is a negative value or not (step S1104). If the common mode voltage is not a negative value (No at step S1104), the common mode voltage is a zero value, and the process then proceeds to step S1105, at which step the value of the common voltage component $v_{ofst}$ to be superimposed on each of the three mean voltage commands $v_{su1}^*$, $v_{sv1}^*$, and $v_{sw1}^*$ is set to 0 (step S1105). Then, the common voltage component $v_{ofst}$ is superimposed on each of the three mean voltage commands $v_{su1}^*$, $v_{sv1}^*$, and $v_{sw1}^*$ to compute the mean voltage commands $v_{su2}^*$, $v_{sv2}^*$, and $v_{sw2}^*$ resulting from the superimposition (step S1106).

Otherwise, if the common mode voltage of the three-phase three-level inverter 4 is a positive value (Yes at step S1103), the common mode voltage of the single-phase inverters 5, 6, and 7 should be a negative value to reduce pulsation of the common mode voltage. In this situation, it is determined whether the minimum phase $v_{min}$ exceeds (falls below) the minimum value $-v_{sdc}$ that can be output (step S1107). If the minimum phase $v_{min}$ exceeds the minimum value $-v_{sdc}$ that can be output (Yes at step S1107), the common voltage component $v_{ofst}$ is determined to make the minimum phase $v_{min}$ equal to $-v_{sdc}$ (step S1108). Note that the minimum phase $v_{min}$ can be made equal to $-v_{sdc}$ by computation of $v_{ofst}=v_{min}+v_{sdc}$. Meanwhile, if the minimum phase $v_{min}$ does not exceed the minimum value $-v_{sdc}$ that can be output (No at step S1107), the value of the common voltage component $v_{ofst}$ is set to 0 (step S1109). After steps S1107 and S1108, the process proceeds to step S1106, at which step the foregoing computation operation is performed.

In addition, at step S1104, if the common mode voltage of the three-phase three-level inverter 4 is a negative value (Yes at step S1104), the common mode voltage of the single-phase inverters 5, 6, and 7 should be a positive value to reduce pulsation of the common mode voltage. In this situation, it is determined whether the maximum phase $v_{max}$ exceeds the maximum value $v_{sdc}$ that can be output (step S1110). If the maximum phase $v_{max}$ exceeds the maximum value $v_{sdc}$ that can be output (Yes at step S1110), the common voltage component $v_{ofst}$ is determined to make the maximum phase $v_{max}$ equal to $v_{sdc}$ (step S1111). Note that the maximum phase $v_{max}$ can be made equal to $v_{sdc}$ by computation of $v_{ofst}=v_{max}-v_{sdc}$. Meanwhile, if the maximum phase $v_{max}$ does not exceed the maximum value $v_{sdc}$ that can be output (No at step S1110), the value of the common voltage component $v_{ofst}$ is set to 0 (step S1112). After steps S1111 and S1112, the process proceeds to step S1106, at which step the foregoing computation operation is performed.

Figure 13:
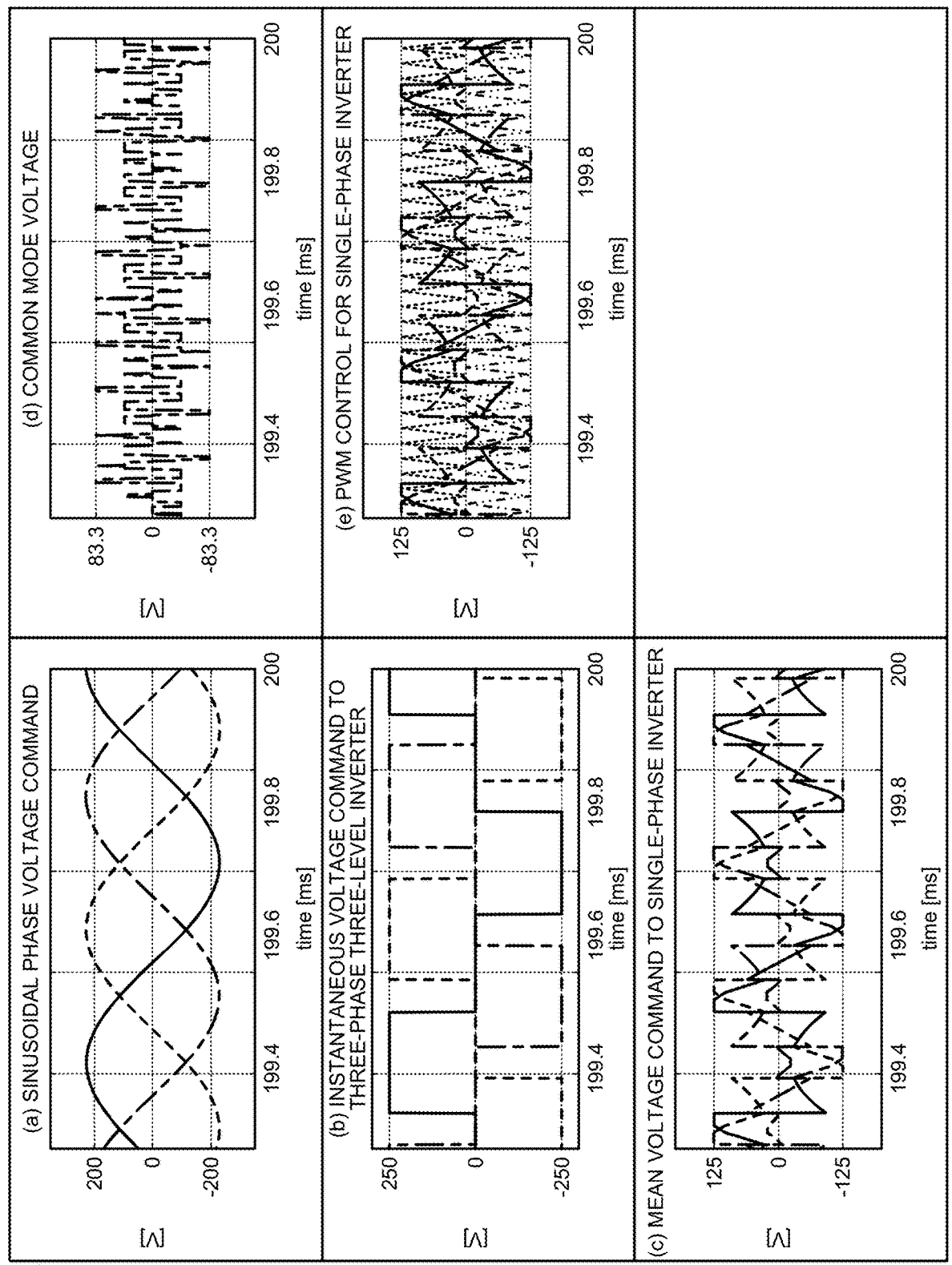
FIG. 13 is a diagram illustrating a set of operation waveforms of a main portion in the second operation performed in the power conversion device according to the second embodiment.

FIG. 13 is a diagram illustrating a set of operation waveforms of a main portion in the second operation performed in the power conversion device 10 according to the second embodiment. The example of FIG. 13 illustrates operation waveforms when the power conversion device 10 is operated according to the flowchart of FIG. 12 under the same load condition as the condition of the example of FIG. 9. Referring particularly to part (c) in FIG. 13, it is seen that the mean voltage commands for the single-phase inverters 5, 6, and 7 do not exceed the maximum value of 125 V that can be output or the minimum value of −125 V that can be output, indicating that no overmodulation is caused. Accordingly, harmonic content of the voltage supplied to the motor 2 will not be increased, and thus the loss will not be increased. Referring also particularly to part (d) in FIG. 13, it is seen that the peak value of pulsation of the common mode voltage is controlled within a range of ±83.3 V. Thus, the power conversion device 10 of the second embodiment provides, in addition to the advantage of the first embodiment, an unprecedented, outstanding advantage in capability of supplying a voltage with reduced harmonic content to a load while reducing or preventing overmodulation even when the voltage of the load drops.

As described above, the power conversion device according to each of the first embodiment and the second embodiment divides the sinusoidal phase voltage commands into the three-phase instantaneous voltage commands to be indicated to the three-phase three-level inverter and the mean voltage commands to be indicated to the respective three single-phase inverters. Then, when the sum of the three-phase instantaneous voltage commands is a positive value, the common voltage component is superimposed on each of the three mean voltage commands to make the sum of the three mean voltage commands a non-positive value. Alternatively, when the sum of the three-phase instantaneous voltage commands is a negative value, the common voltage component is superimposed on each of the three mean voltage commands to make the sum of the three mean voltage commands a non-negative value. These operations can reduce pulsation of the common mode voltage. Thus, common mode noise can be reduced. In addition, the capability of reducing common mode noise enables size reduction and weight reduction of the EMI filter for reducing common mode noise. Thus, an increase in the device size can be avoided.

In addition, the power conversion device according to the second embodiment superimposes the common voltage component on each of the three mean voltage commands to make the first mean voltage command equal to the first voltage in a time period during which the first mean voltage command is greater than the first voltage, where the first mean voltage command has the highest value among the three mean voltage commands, and the first voltage has a maximum value of the voltages caused to be output by the single-phase inverters. Moreover, the power conversion device according to the second embodiment superimposes the common voltage component on each of the three mean voltage commands to make the second mean voltage command equal to the second voltage in a time period during which the second mean voltage command is less than the second voltage, where the second mean voltage command has the lowest value among the three mean voltage commands, and the second voltage has a minimum value of the voltages caused to be output by the single-phase inverters. These operations can reduce or prevent overmodulation to supply a voltage with reduced harmonic content to the load even when the voltage of the load drops, in addition to providing the advantage of the first embodiment.

Third Embodiment

Figure 14:
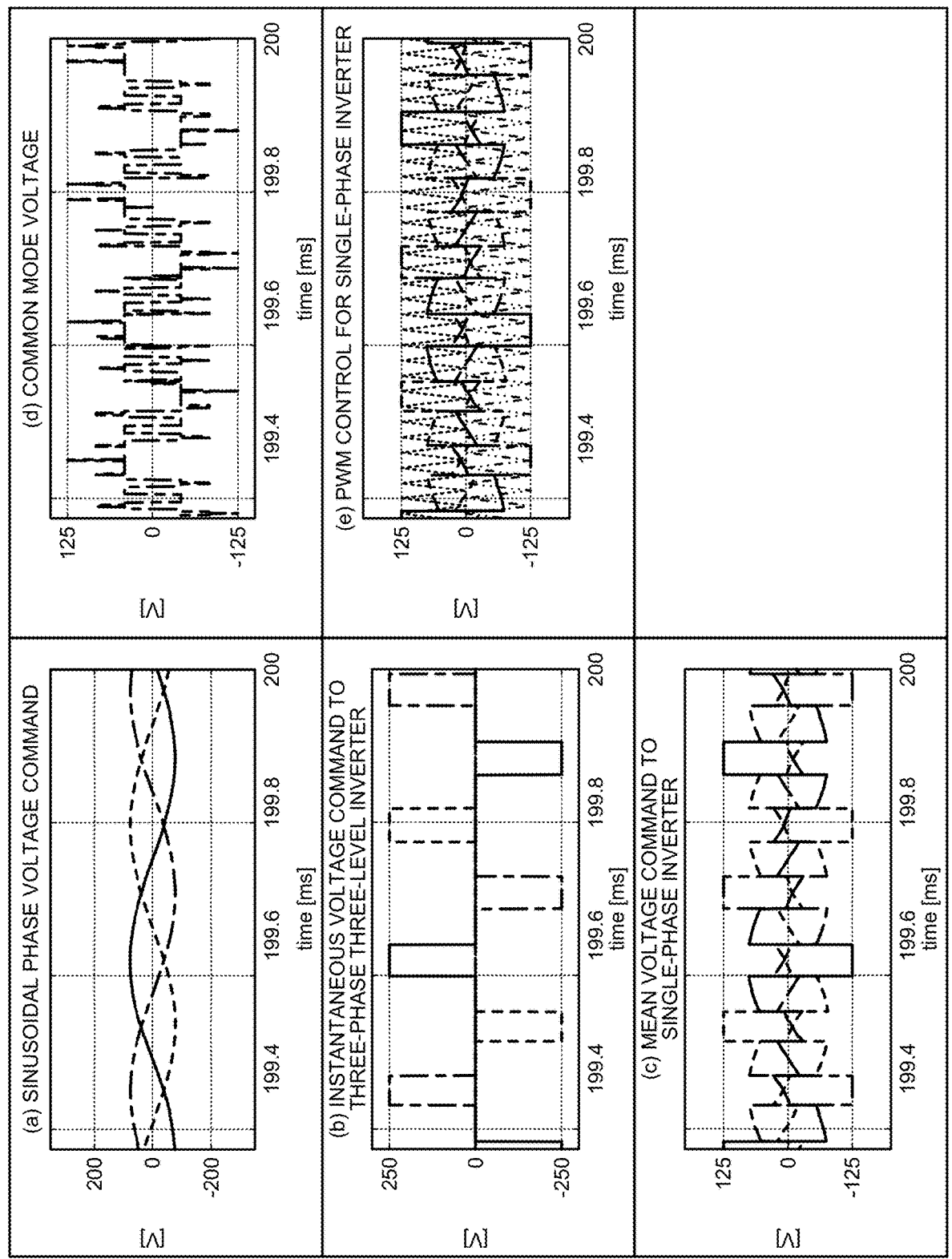
FIG. 14 is a diagram illustrating a set of operation waveforms of a main portion in a third operation performed in the power conversion device according to the second embodiment.

Before describing a configuration and an operation of a third embodiment, an issue to be solved in the third embodiment will be described using the example operation of the second embodiment. FIG. 14 is a diagram illustrating a set of operation waveforms of a main portion in a third operation performed in the power conversion device according to the second embodiment. The term third operation as used herein refers to an operation of the power conversion device 10 according to the second embodiment when the motor 2, which is the load, rotates at a low speed. That is, the operation waveforms of FIG. 14 are those of an example when the rotational speed of the motor 2 is a low speed. Note that the example operation waveforms of interest are the same as those of the case of FIG. 7 and the like.

In the case of low speed rotation, as can be seen by comparison between FIG. 13 and FIG. 14, the amplitude of the sinusoidal phase voltage command is reduced, and the pulse width of the instantaneous value voltages of the three-phase three-level inverter is also reduced. The mean voltage commands for the single-phase inverters are properly controlled within a range from 125 V, i.e., the highest voltage value that can be output, and −125 V, i.e., the lowest voltage value that can be output, but pulsation of the common mode voltage is increased to cause the peak value thereof to increase to 125 V. This will increase common mode noise, which will, in turn, increase the size of the EMI filter for reducing this common mode noise. Thus, the third embodiment will be described in the context of a power conversion device capable of reducing pulsation of the common mode voltage even when the voltage of the load largely drops.

Figure 15:
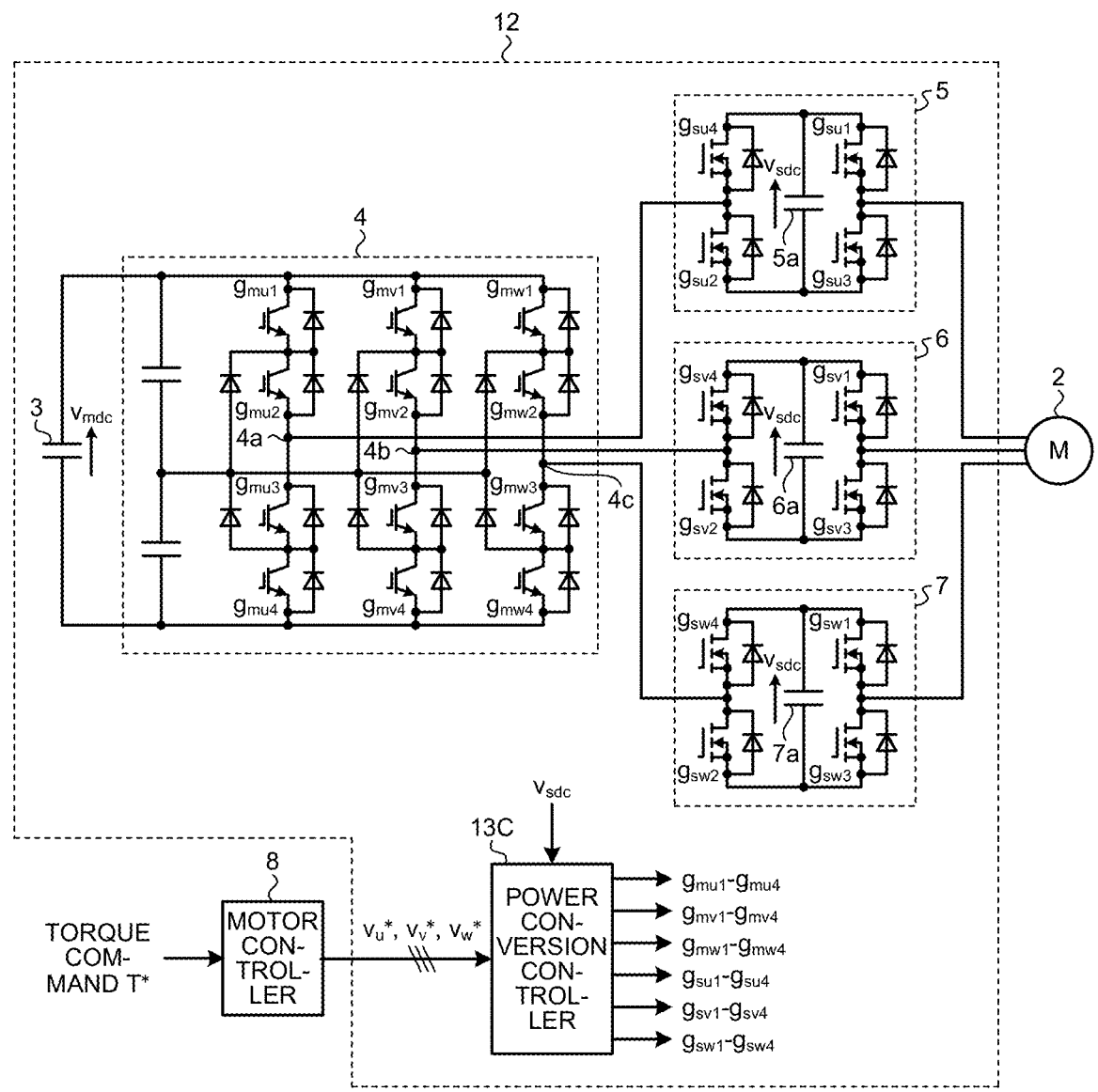
FIG. 15 is a circuit diagram illustrating a configuration of a power conversion device according to a third embodiment.

FIG. 15 is a circuit diagram illustrating a configuration of a power conversion device according to the third embodiment. In FIG. 15, a power conversion device 12 according to the third embodiment is configured similarly to the power conversion device 10 according to the second embodiment illustrated in FIG. 10, but includes a power conversion controller 13C in place of the power conversion controller 11B. Note that the other part of the configuration is the same as or equivalent to the corresponding part of the configuration of the first embodiment. Identical or equivalent components are designated by like reference characters, and duplicate description thereof will be omitted.

Figure 16:
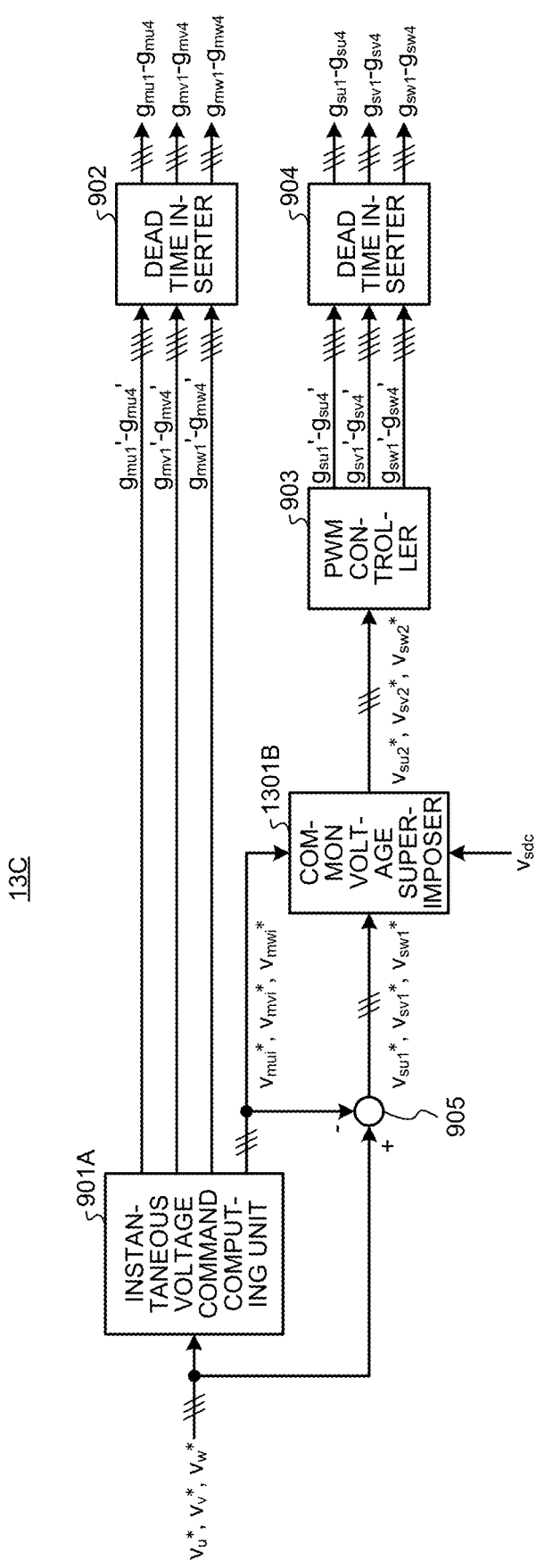
FIG. 16 is a block diagram illustrating a configuration of the power conversion controller in the third embodiment.

FIG. 16 is a block diagram illustrating a configuration of the power conversion controller 13C in the third embodiment. In FIG. 16, the power conversion controller 13C in the third embodiment is configured similarly to the power conversion controller 11B in the second embodiment illustrated in FIG. 11, but includes a common voltage superimposer 1301B in place of the common voltage superimposer 1101A. The other part of the configuration is the same as or equivalent to the corresponding part of the configuration of the second embodiment. Identical or equivalent components are designated by like reference characters, and duplicate description thereof will be omitted.

Figure 17:
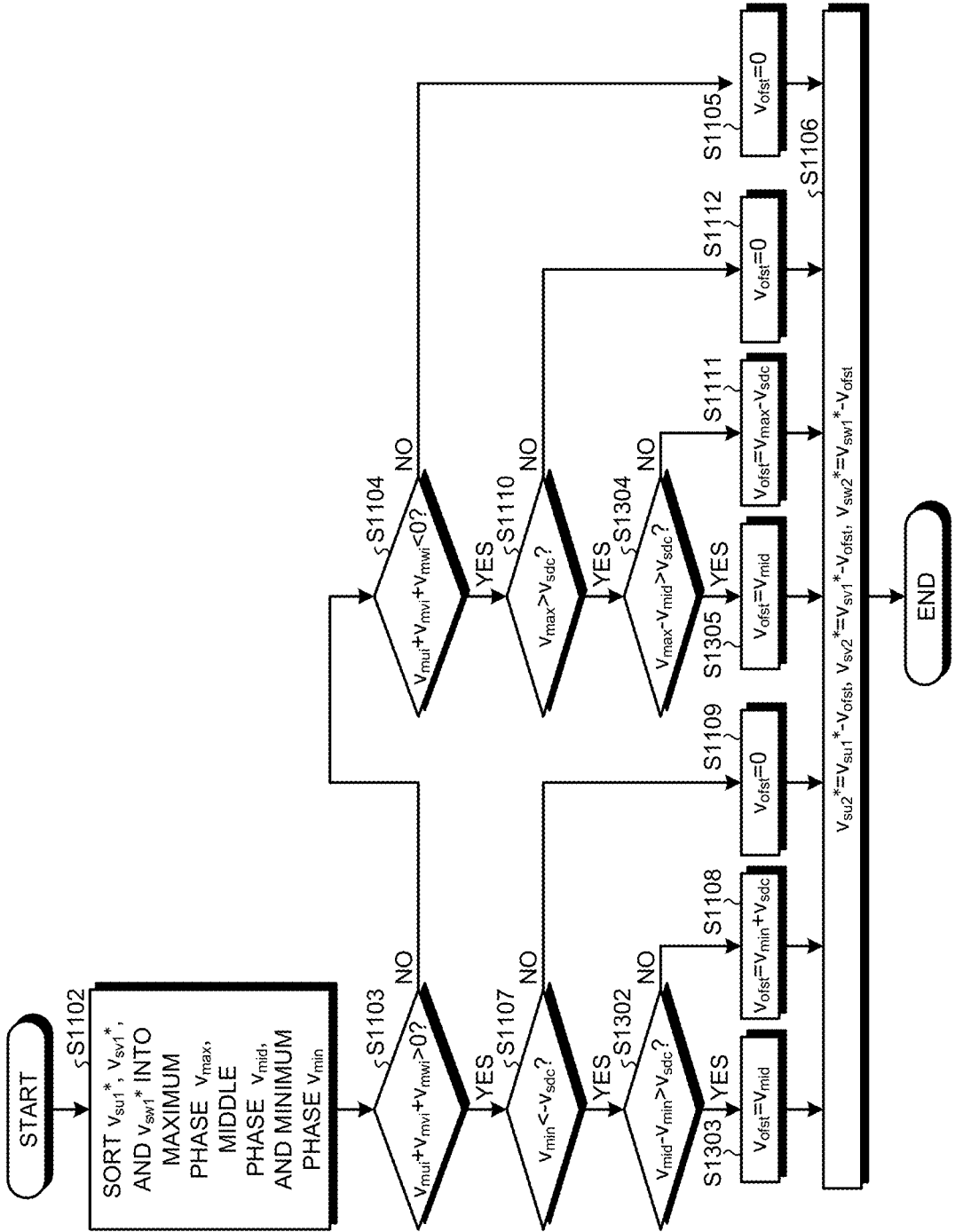
FIG. 17 is a diagram illustrating, using a flowchart, an example of algorithm performed by the common voltage superimposer of the third embodiment.

An example of algorithm performed by the common voltage superimposer 1301B will next be described with reference to FIG. 17. FIG. 17 is a diagram illustrating, using a flowchart, an example of algorithm performed by the common voltage superimposer 1301B of the third embodiment. Note that processing blocks identical or equivalent to the corresponding ones of the flowchart of the second embodiment illustrated in FIG. 12 are designated by like reference characters, and duplicate description thereof will be omitted as appropriate.

The flowchart illustrated in FIG. 17 differs from the flowchart illustrated in FIG. 12 in the processing blocks illustrated at steps S1302 to S1305. If, at step S1103, the common mode voltage of the three-phase three-level inverter 4 is a positive value (Yes at step S1103), the common mode voltage of the single-phase inverters 5, 6, and 7 should be a negative value to reduce pulsation of the common mode voltage. In this situation, it is determined, in the second embodiment, whether the minimum phase $v_{min}$ exceeds the minimum value $-v_{sdc}$ that can be output (step S1107 in FIG. 12), and if the minimum phase $v_{min}$ exceeds the minimum value $-v_{sdc}$ that can be output (Yes at step S1107 in FIG. 12), the common voltage component $v_{ofst}$ is determined to make the minimum phase $v_{min}$ equal to $-v_{sdc}$ (step S1108 in FIG. 12).

However, when the middle phase $v_{mid}$ exceeds a zero value after superimposition of the common voltage component $v_{ofst}$, the common mode voltage of the single-phase inverters 5, 6, and 7 will be positive, thereby causing the operation to fail to cancel the common mode voltage of the three-phase three-level inverter 4. Such phenomenon occurs when the difference between the middle phase $v_{mid}$ and the minimum phase $v_{min}$ is greater than the absolute value $v_{sdc}$ of the DC-side capacitor voltage of the single-phase inverters 5, 6, and 7. Thus, it is determined whether the difference between the middle phase $v_{mid}$ and the minimum phase $v_{min}$ is greater than the absolute value $v_{sdc}$ (step S1302). Then, if the difference between the middle phase $V_{mid}$ and the minimum phase $v_{min}$ is greater than the absolute value $v_{sdc}$ (Yes at step S1302), the common voltage component $v_{ofst}$ is computed to make the middle phase $v_{mid}$ equal to zero (step S1303). Note that the middle phase $v_{mid}$ can be made zero by computation of $v_{ofst}=v_{mid}$. After step S1303, the process proceeds to step S1106, at which step the foregoing computation operation is performed.

In addition, at step S1104, if the common mode voltage of the three-phase three-level inverter 4 is a negative value (Yes at step S1104), the common mode voltage of the single-phase inverters 5, 6, and 7 should be a positive value to reduce pulsation of the common mode voltage. In this situation, a condition exists in the process of the second embodiment in which the operation fails to cancel the common mode voltage of the three-phase three-level inverter 4. Specifically, this occurs when the difference between the maximum phase $v_{max}$ and the middle phase $v_{mid}$ is greater than the absolute value $v_{sdc}$ of the DC-side capacitor voltage of the single-phase inverters 5, 6, and 7. Thus, it is determined whether the difference between the maximum phase $v_{max}$ and the middle phase $v_{mid}$ is greater than the absolute value $v_{sdc}$ (step S1304). Then, if the difference between the maximum phase $v_{max}$ and the middle phase $v_{mid}$ is greater than the absolute value $v_{sdc}$ (Yes at step S1304), the common voltage component $v_{ofst}$ is computed to make the middle phase $v_{mid}$ equal to zero (step S1305). Note that the middle phase $v_{mid}$ can be made zero by computation of $v_{ofst}=v_{mid}$. After step S1305, the process proceeds to step S1106, at which step the foregoing computation operation is performed.

Figure 18:
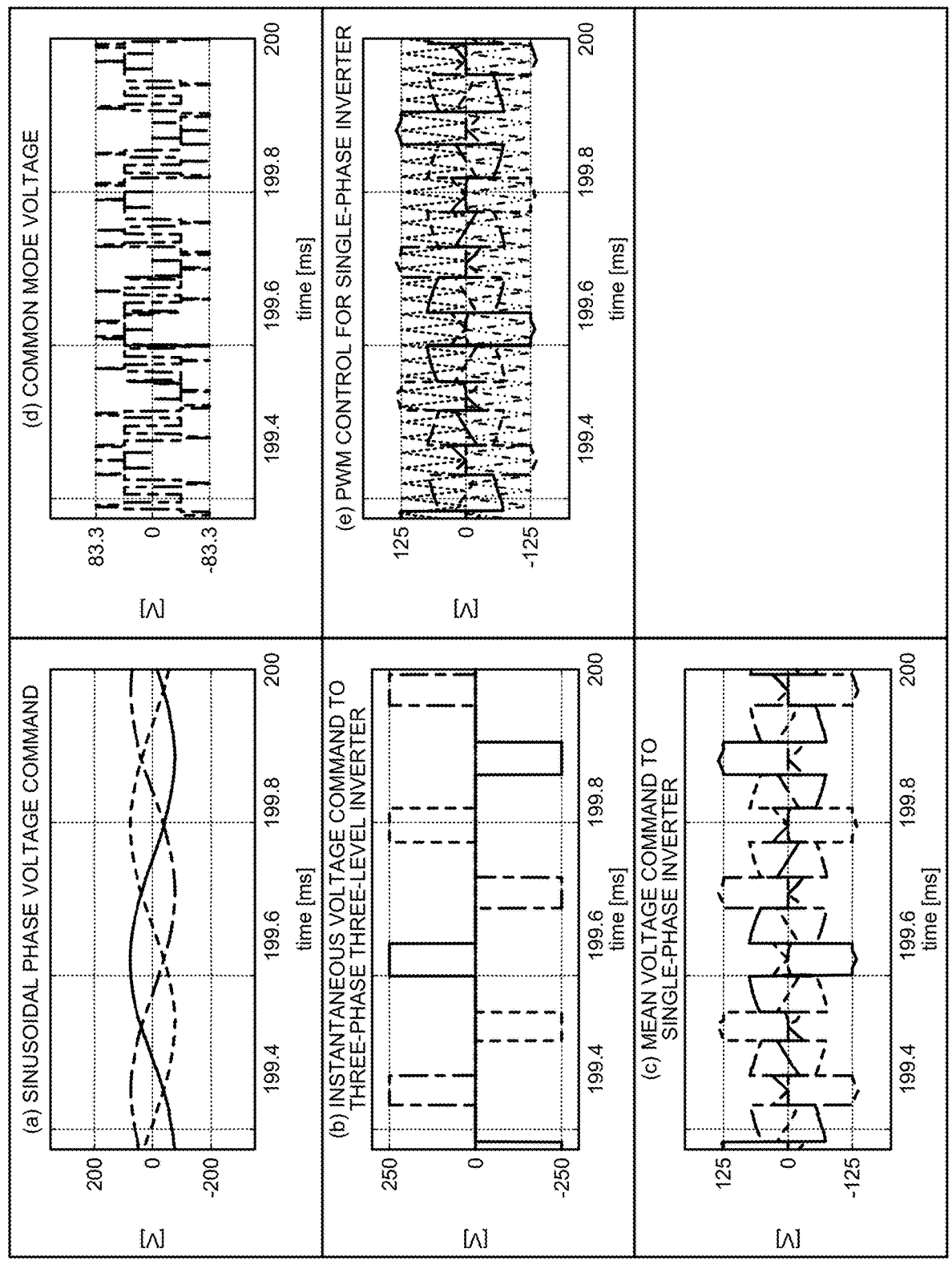
FIG. 18 is a diagram illustrating a set of operation waveforms of a main portion in the third operation performed in the power conversion device according to the third embodiment.

FIG. 18 is a diagram illustrating a set of operation waveforms of a main portion in the third operation performed in the power conversion device 12 according to the third embodiment. The example of FIG. 18 illustrates operation waveforms when the power conversion device 12 is operated according to the flowchart of FIG. 17 under the same load condition as the condition of the example of FIG. 14. Referring particularly to part (d) in FIG. 18, it is seen that the peak value of pulsation of the common mode voltage is controlled within a range of ±83.3 V. Thus, the power conversion device 12 according to the third embodiment provides an unprecedented, outstanding advantage in that common mode noise can be reduced even when the voltage of the load largely drops, in addition to the advantages of the first embodiment and of the second embodiment.

As described above, the power conversion device according to the third embodiment superimposes the common voltage component on each of the three mean voltage commands to make the third mean voltage command equal to zero in a time period during which the first mean voltage command is greater than the first voltage, and the difference between the first mean voltage command and the third mean voltage command is greater than the first voltage, where the third mean voltage command has a middle value among the three mean voltage commands. Moreover, the power conversion device according to the third embodiment superimposes the common voltage component on each of the three mean voltage commands to make the third mean voltage command equal to zero in a time period during which the second mean voltage command is less than the second voltage, and the difference between the third mean voltage command and the second mean voltage command is greater than the first voltage. These operations can reduce common mode noise even when the voltage of the load largely drops, in addition to providing the advantage of the first embodiment and of the second embodiment.

Fourth Embodiment

The first embodiment through the third embodiment assume that the three-phase three-level inverter 4 operates with a single pulse voltage. However, when a higher number of times of switching is feasible, a higher switching frequency may be used. A power conversion device according to a fourth embodiment capable of operating to cause the three-phase three-level inverter 4 to operate with a three-pulse voltage will next be described.

Figure 19:
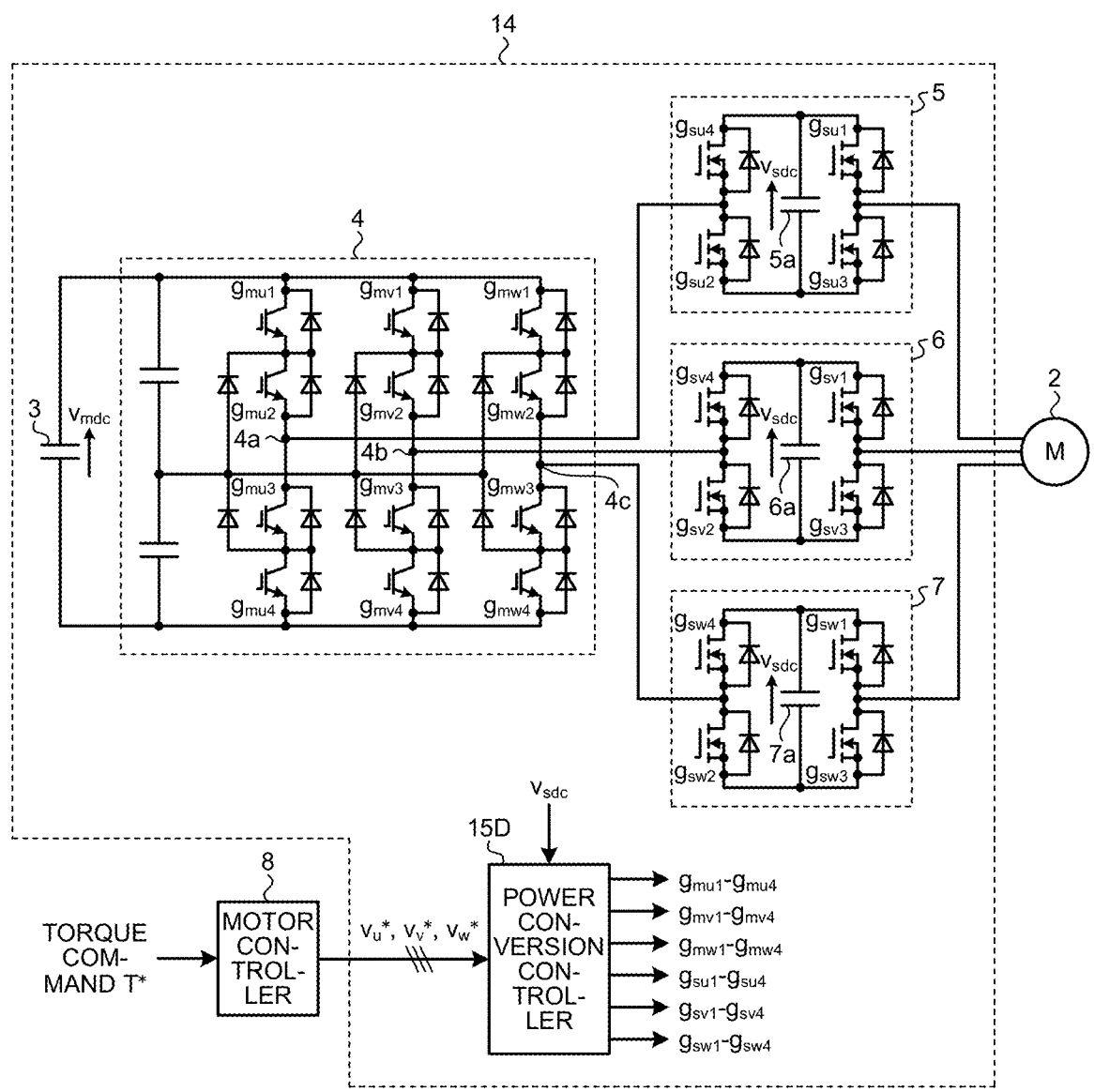
FIG. 19 is a circuit diagram illustrating a configuration of a power conversion device according to a fourth embodiment.

FIG. 19 is a circuit diagram illustrating a configuration of a power conversion device according to the fourth embodiment. In FIG. 19, a power conversion device 14 according to the fourth embodiment is configured similarly to the power conversion device 12 according to the third embodiment illustrated in FIG. 15, but includes a power conversion controller 15D in place of the power conversion controller 13C. Note that the other part of the configuration is the same as or equivalent to the corresponding part of the configuration of the first embodiment. Identical or equivalent components are designated by like reference characters, and duplicate description thereof will be omitted.

Figure 20:
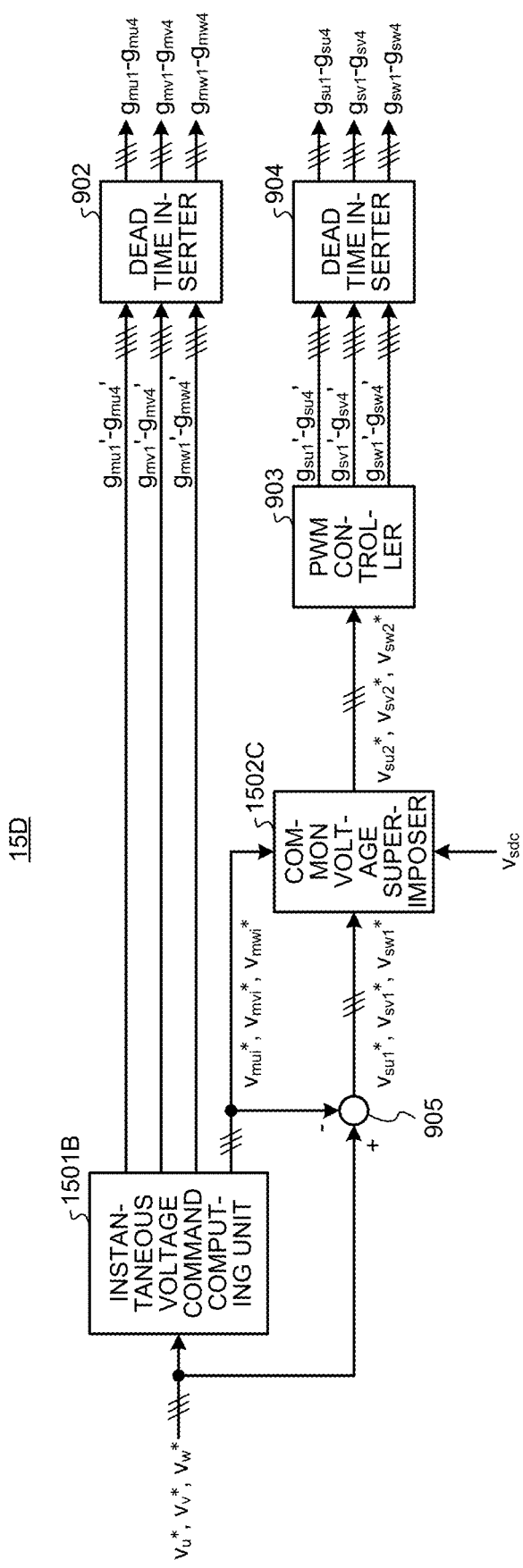
FIG. 20 is a block diagram illustrating a configuration of the power conversion controller in the fourth embodiment.

FIG. 20 is a block diagram illustrating a configuration of the power conversion controller 15D in the fourth embodiment. In FIG. 20, the power conversion controller 15D in the fourth embodiment is configured similarly to the power conversion controller 13C in the third embodiment illustrated in FIG. 16, but includes an instantaneous voltage command computing unit 1501B in place of the instantaneous voltage command computing unit 901A, and a common voltage superimposer 1502C in place of the common voltage superimposer 1301B. The other part of the configuration is the same as or equivalent to the corresponding part of the configuration of the second embodiment. Identical or equivalent components are designated by like reference characters, and duplicate description thereof will be omitted.

Figure 21:
FIG. 21 is a diagram illustrating an example waveform of one phase of the instantaneous voltage commands generated by the instantaneous voltage command computing unit of FIG. 20.

The instantaneous voltage command computing unit 1501B computes the instantaneous voltage commands $v_{mui}^*$, $v_{mvi}^*$, and $v_{mwi}^*$ to be indicated to the three-phase three-level inverter 4. However, the instantaneous voltage commands $v_{mui}^*$, $v_{mvi}^*$, and $v_{mwi}^*$ each have a waveform as illustrated in FIG. 21, which is different from the waveform of the first embodiment. FIG. 21 is a diagram illustrating an example waveform of one phase of the instantaneous voltage commands generated by the instantaneous voltage command computing unit 1501B of FIG. 20.

The voltage waveform illustrated in FIG. 21 is a three-pulse voltage having an absolute value that is ½ of the DC voltage $v_{mdc}$ from the DC power supply 3, and having a portion of a positive voltage polarity and a portion of a negative voltage polarity each being repeated three times during a fundamental wave period of the sinusoidal phase voltage commands $v_u^*$, $v_v^*$, and $v_w^*$. The fundamental wave period is a time period corresponding to the range from 0° elec. to 360° elec. in the diagram.

The three-pulse voltage representing the instantaneous voltage command $v_{mxi}^*$ is, as illustrated in FIG. 21, a voltage waveform that transitions based on the phase and on phase angles $\alpha_1$, $\alpha_2$, and $\alpha_3$ of the sinusoidal phase voltage command $v_x^*$. The phase angles $\alpha_1$, $\alpha_2$, and $\alpha_3$ will be described in detail later. In addition, the phase angle $\alpha_1$ may be referred to herein as "first phase angle", the phase angle $\alpha_2$ may be referred to herein as "second phase angle", and the phase angle $\alpha_3$ may be referred to herein as "third phase angle".

Specifically, in the example of FIG. 21, the three-pulse voltage has a value changing, during a fundamental wave half period, such that the value is a zero value at a phase of zero, changes to a positive value at the phase $\alpha_1$, returns to the zero value at the phase $\alpha_2$, changes to a positive value at the phase $\alpha_3$, returns to the zero value at a phase 180−$\alpha_3$, changes to a positive value at a phase 180−$\alpha_2$, returns to the zero value at a phase 180−$\alpha_1$, and is then maintained at the zero value until the phase of 180. The waveform in a phase range from the phase of 180 to the phase of 360 is odd symmetric with respect to the waveform in a phase range from the phase of 0 to the phase of 180. Odd symmetry can be expressed by a relationship of v(θ)=v(180−θ), where θ is the phase and, v(θ) is the instantaneous voltage command.

At this stage, to make the fundamental wave components of both the sinusoidal phase voltage command $v_x^*$ and the instantaneous voltage command $v_{mxi}^*$ equal to each other, the foregoing phase angles $\alpha_1$, $\alpha_2$, and $\alpha_3$ are determined to satisfy the following equation.

[Formula 2]

$$\frac{4}{\pi}(\cos\alpha_1 - \cos\alpha_2 + \cos\alpha_3) = m \qquad (2)$$

Note that m in Equation (2) above is the modulation factor, defined by the following equation.

[Formula 3]

$$m = \frac{v_{php}}{v_{mdc}/2} \quad (3)$$

In this regard, Equation (2) has three phase angles, which are variables. Therefore, the phase angles are indeterminable with only one constraint condition in this situation. Then, in the third embodiment, the phase angles are determined to eliminate a low-order harmonic component. Specifically, two equations below are added to Equation (2) above to provide three constraint conditions to determine the three phase angles $\alpha_1$, $\alpha_2$, and $\alpha_3$. This can be solved using various numerical solutions, such as Newton's method.

[Formula 4]

$$\cos 5\alpha_1 - \cos 5\alpha_2 + \cos 5\alpha_3 = 0 \quad (4)$$

[Formula 5]

$$\cos 7\alpha_1 - \cos 7\alpha_2 + \cos 7\alpha_3 = 0 \quad (5)$$

Note that outputting the voltage of the fundamental wave component by the three-phase three-level inverter 4 to cover all the power of the fundamental wave component similarly to the first embodiment will eliminate the need for a DC power supply on the DC-side of the single-phase inverters 5, 6, and 7. In this case, one possible method is to connect a capacitor for smoothing the DC voltage instead of a DC power supply.

Figure 22:
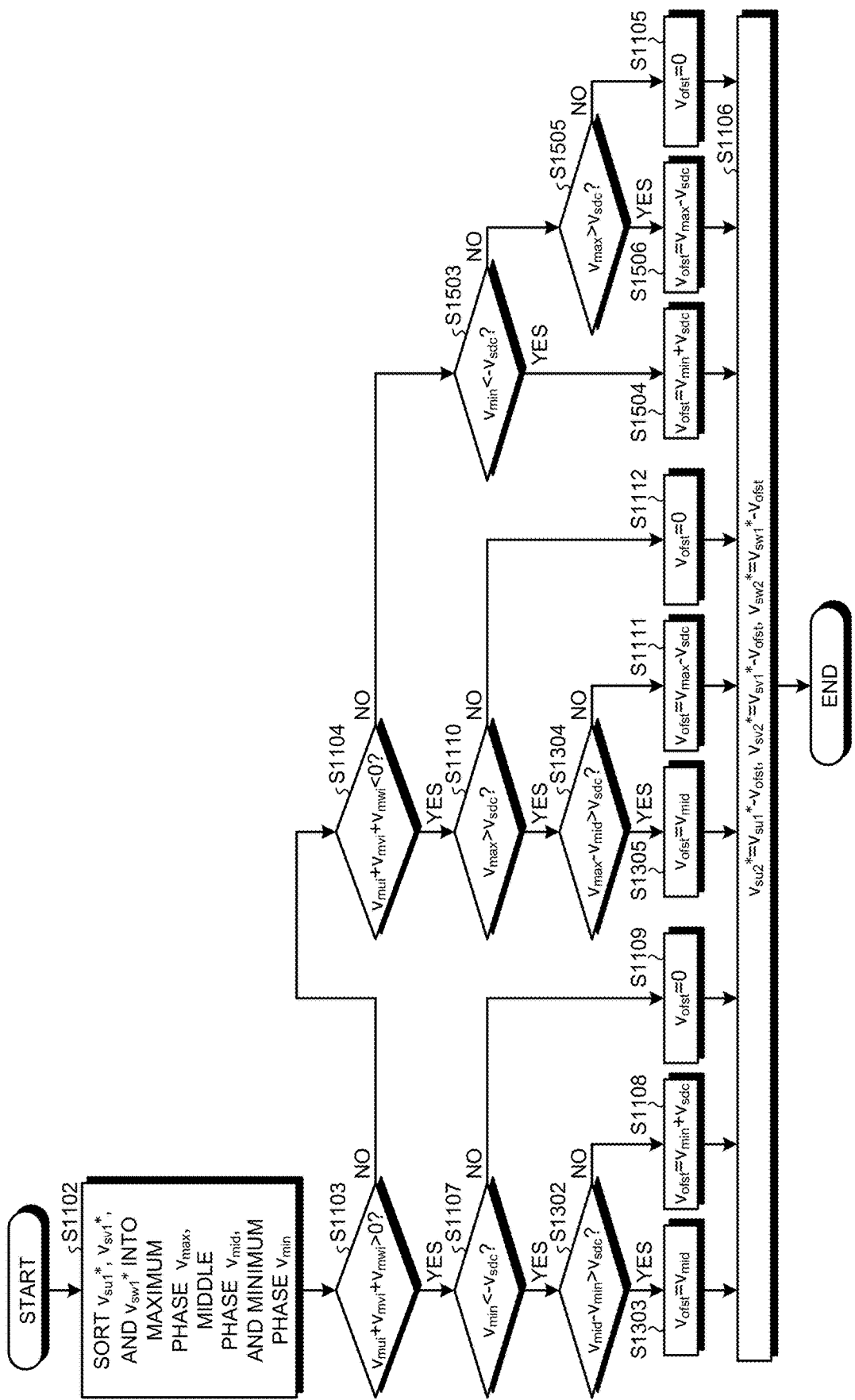
FIG. 22 is a diagram illustrating, using a flowchart, an example of algorithm performed by the common voltage superimposer of the fourth embodiment.

An example of algorithm performed by the common voltage superimposer 1502C will next be described with reference to FIG. 22. FIG. 22 is a diagram illustrating, using a flowchart, an example of algorithm performed by the common voltage superimposer 1502C of the fourth embodiment. Note that processing blocks identical or equivalent to the corresponding ones of the flowchart of the third embodiment illustrated in FIG. 17 are designated by like reference characters, and duplicate description thereof will be omitted as appropriate.

The flowchart illustrated in FIG. 22 differs from the flowchart illustrated in FIG. 17 in the processing blocks illustrated at steps S1503 to S1506. When the three-phase three-level inverter 4 is operated with a three-pulse voltage, there may be a case in which at least one of the mean voltage commands to be indicated to the single-phase inverters 5, 6, and 7 exceeds the minimum value $-v_{sdc}$ that can be output even when the common mode voltage of the three-phase three-level inverter 4 has a zero value (No at step S1104). Thus, it is determined whether at least one of the mean voltage commands to be indicated to the single-phase inverters 5, 6, and 7 exceeds the minimum value $-v_{sdc}$ that can be output (step S1503), and if the minimum value $-v_{sdc}$ that can be output is exceeded (Yes at step S1503), the common voltage component $v_{ofst}$ is determined to make the minimum phase $v_{min}$ equal to $-v_{sdc}$ (step S1504). Note that the minimum phase $v_{min}$ can be made equal to $-v_{sdc}$ by computation of $v_{ofst}=v_{min}+v_{sdc}$.

Alternatively, if none of the mean voltage commands to be indicated to the single-phase inverters 5, 6, and 7 exceeds the minimum value $-v_{sdc}$ that can be output (No at step S1503), it is further determined whether at least one of the mean voltage commands to be indicated to the single-phase inverters 5, 6, and 7 exceeds the maximum value $v_{sdc}$ that can be output (step S1505). If at least one of the mean voltage commands to be indicated to the single-phase inverters 5, 6, and 7 exceeds the maximum value $v_{sdc}$ that can be output (Yes at step S1505), the common voltage component $v_{ofst}$ is determined to make the maximum phase $v_{max}$ equal to $v_{sdc}$ (step S1506). Note that the maximum phase $v_{max}$ can be made equal to $v_{sdc}$ by computation of $v_{ofst}=v_{max}-v_{sdc}$. Meanwhile, if the maximum phase $v_{max}$ does not exceed the maximum value $v_{sdc}$ that can be output (No at step S1505), the value of the common voltage component $v_{ofst}$ is set to 0 (step S1105). After steps S1504, S1505, and S1105, the process proceeds to step S1106, at which step the foregoing computation operation is performed.

Figure 23:
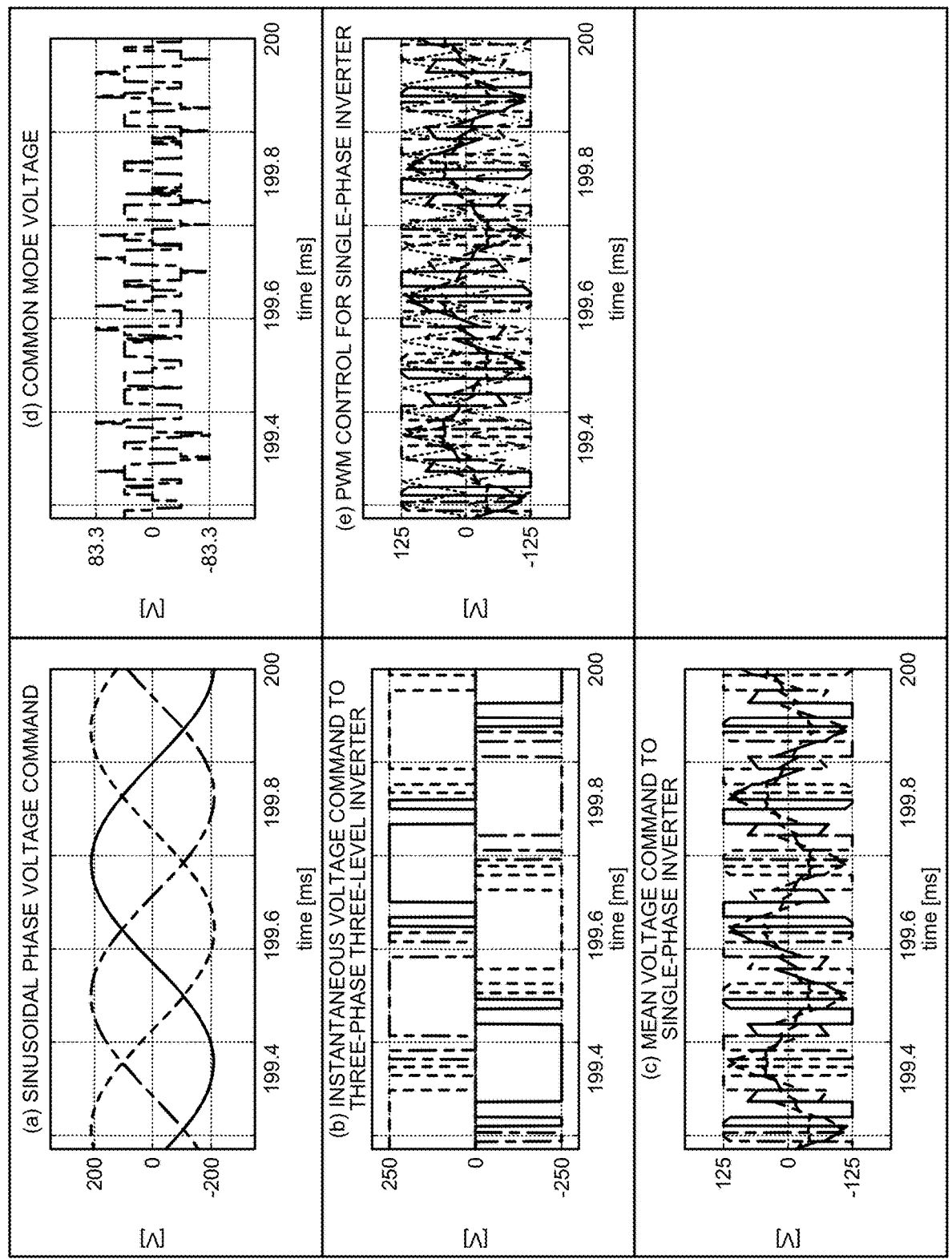
FIG. 23 is a diagram illustrating a set of operation waveforms of a main portion in the second operation performed in the power conversion device according to the fourth embodiment.

FIG. 23 is a diagram illustrating a set of operation waveforms of a main portion in the second operation performed in the power conversion device 14 according to the fourth embodiment. That is, FIG. 23 illustrates operation waveforms when the power conversion device 14 according to the fourth embodiment operates the motor 2 to rotate at a middle speed.

Referring particularly to part (d) in FIG. 23, it is seen that the peak value of pulsation of the common mode voltage is controlled within a range of ±83.3 V also when the three-phase three-level inverter 4 is operated with a three-pulse voltage. Referring also particularly to part (c) in FIG. 23, it is seen that the mean voltage commands for the single-phase inverters 5, 6, and 7 are maintained within a range from the maximum value 125 V that can be output, to the minimum value −125 V that can be output, indicating that no over-modulation is caused. Accordingly, the power conversion device 14 of the fourth embodiment is capable of reducing common mode noise also when the three-phase three-level inverter 4 is operated with a three-pulse voltage. In addition, the capability of reducing common mode noise enables size reduction and weight reduction of the EMI filter for reducing common mode noise. Thus, an increase in the device size can be avoided.

Figure 24:
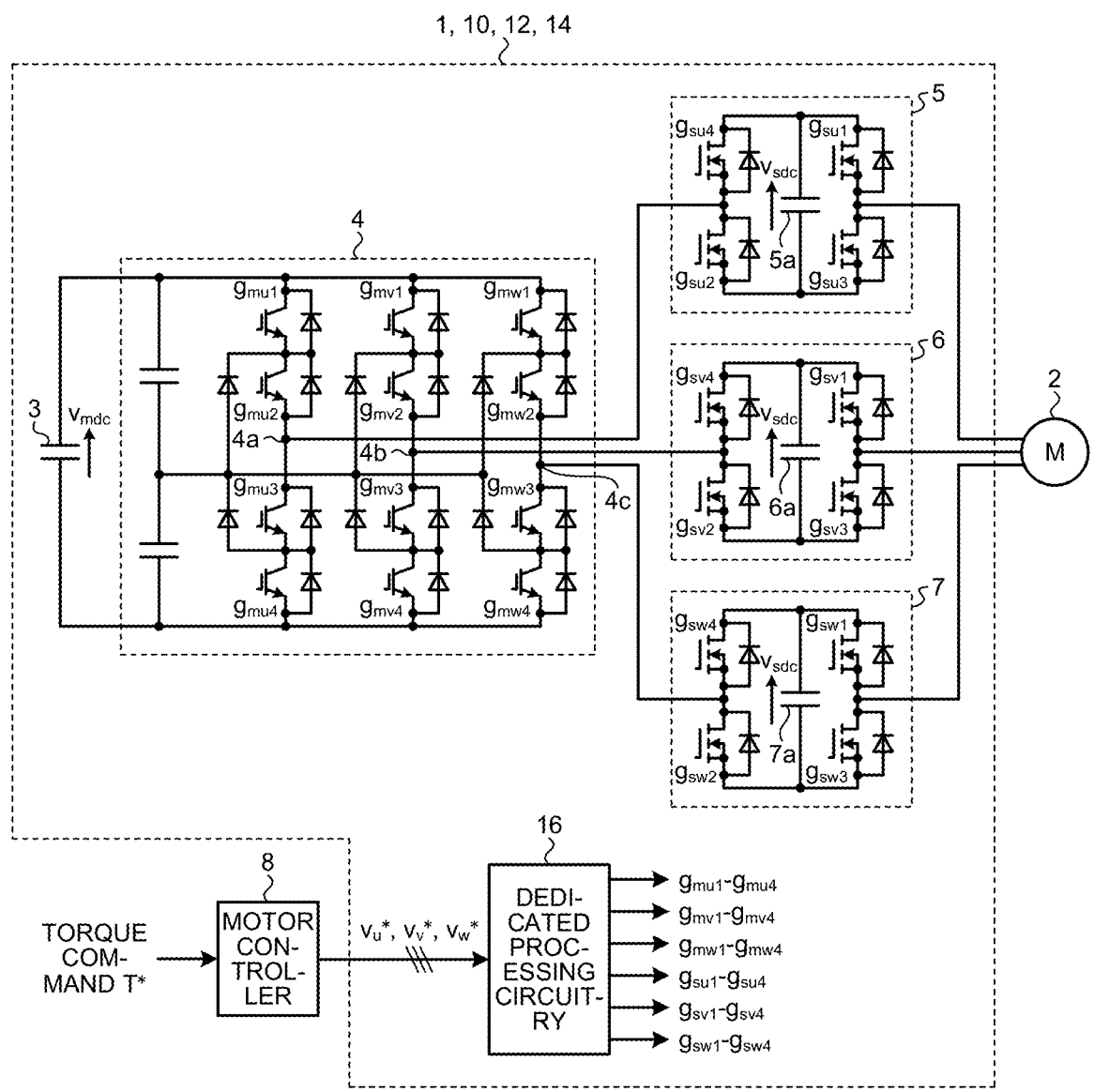
FIG. 24 is a diagram illustrating an example of hardware configuration for implementing each functionality of the power conversion controllers according to the first embodiment through the fourth embodiment.
Figure 25:
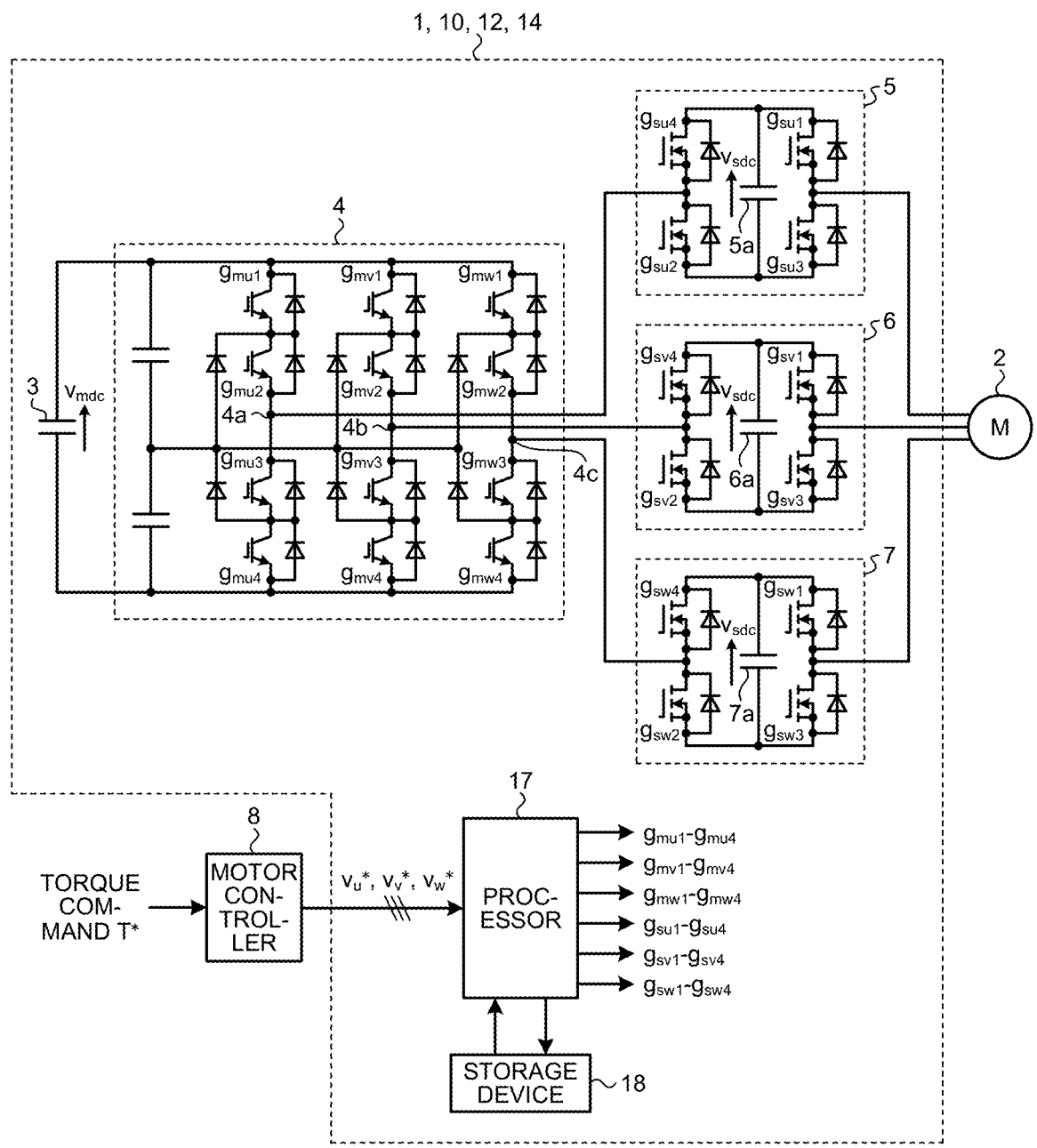
FIG. 25 is a diagram illustrating another example of hardware configuration for implementing each functionality of the power conversion controllers according to the first embodiment through the fourth embodiment.

A hardware configuration of the power conversion devices according to the first embodiment through the fourth embodiment described above will next be described with reference to FIGS. 24 and 25. FIG. 24 is a diagram illustrating an example of hardware configuration for implementing the functionalities of the power conversion controllers according to the first embodiment through the fourth embodiment. FIG. 25 is a diagram illustrating another example of hardware configuration for implementing the functionalities of the power conversion controllers according to the first embodiment through the fourth embodiment. Note that the phrase "the functionalities of the power conversion controllers" refers to the functionality of the instantaneous voltage command computing units 901A and 1501B, of the dead time inserters 902 and 904, of the PWM controller 903, and of the common voltage superimposers 1101A, 1301B, and 1502C, included in the power conversion controllers 9A, 11B, 13C, and 15D.

The functionalities of the power conversion controllers can be implemented using processing circuitry. FIG. 24 illustrates dedicated processing circuitry 16 in place of the power conversion controllers 9A, 11B, 13C, and 15D in the configurations of the first embodiment through the fourth embodiment. In the case of use of a dedicated hardware element, the dedicated processing circuitry 16 may be a single circuit, a set of multiple circuits, a programmed processor, a parallel programmed processor, an application-specific integrated circuit (ASIC), a field-programmable gate array (FPGA), or a combination thereof. The functionalities of the power conversion controllers may each be implemented by separate processing circuitry, or may together be implemented by processing circuitry.

Meanwhile, FIG. 25 illustrates a processor 17 and a storage device 18 in place of the power conversion controllers 9A, 11B, 13C, and 15D in the configurations of the first embodiment through the fourth embodiment. The processor 17 may be computing means such as a computing unit, a microprocessor, a microcomputer, a central processing unit (CPU), or a digital signal processor (DSP). In addition, the storage device 18 may be, for example, a non-volatile or volatile semiconductor memory such as a random access memory (RAM), a read-only memory (ROM), a flash memory, an erasable programmable ROM (EPROM), or an electrically erasable programmable ROM (EEPROM)®.

In the case of use of the processor 17 and the storage device 18, the functionalities of the power conversion controllers are implemented in software, firmware, or a combination thereof. The software or firmware is described as a program or programs, and is stored in the storage device 18. The processor 17 reads and executes a program stored in the storage device 18. It can also be said that these programs cause a computer to perform a procedure and a method of the functionalities of the power conversion controllers.

The functionalities of the power conversion controllers may be implemented partially in hardware and partially in software or firmware. For example, the functionalities may be implemented such that the functionalities of the dead time inserters 902 and 904 and of the PWM controller 903 are implemented using a dedicated hardware element, while the functionalities of the instantaneous voltage command computing units 901A and 1501B and of the common voltage superimposers 1101A, 1301B, and 1502C are implemented using the processor 17 and the storage device 18.

Note that a case has herein been described, by way of example, in which the load is a motor, and the torque of the motor is controlled in consideration of operation waveforms or the like, but the situation is not limited thereto. The speed of the motor may be controlled. In addition, the load may be other than a motor. Moreover, other examples of load connection include an application in which the power conversion device is connected to a grid power supply or to another power converter, and active power or reactive power is controlled. Furthermore, although illustrated using a voltage source symbol, the DC power supply may be a battery, or a voltage from a power system rectified by a transformer or by a semiconductor element may be used. Still furthermore, although described as a diode clamp type by way of example, the three-phase three-level inverter may be of a capacitor clamp type, or one using a bidirectional switch between the output terminal of each phase and the DC neutral point.

The semiconductor elements used in the three-phase three-level inverter and in the single-phase inverters are illustrated using an insulated-gate bipolar transistor (IGBT) or a metal-oxide-semiconductor field-effect transistor (MOSFET) symbol, but any semiconductor element that can be turned on and off may be used. In addition, the voltage waveform of the three-phase three-level inverter has been described in the context of a single pulse voltage and a three-pulse voltage, but the number of pulses is not limited thereto. Moreover, a multiple-pulse voltage may be generated by PWM control that compares a voltage command with the carrier. Alternatively, a pulse pattern having optimized phase angles as described in the fourth embodiment may be used. Such optimization may be performed using various conditions such as minimization of the root-mean-square current value, in addition to elimination of a low-order harmonic.

In addition, the configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1, 10, 12, 14 power conversion device; 2 motor; 3 DC power supply; 4 three-phase three-level inverter; 4a, 4b, 4c AC terminal; 5, 6, 7 single-phase inverter; 5a, 6a, 7a capacitor; 8 motor controller; 9A, 11B, 13C, 15D power conversion controller; 16 dedicated processing circuitry; 17 processor; 18 storage device; 901A, 1501B instantaneous voltage command computing unit; 902, 904 dead time inserter; 903 PWM controller; 905 subtractor; 1101A, 1301B, 1502C common voltage superimposer.

The invention claimed is:

1. A power conversion device that converts direct current power into alternating current power for a load, and supplies the alternating current power to the load, the power conversion device comprising:
    a three-phase three-level inverter connected between positive and negative terminals of a direct current power supply;
    three single-phase inverters respectively connected between the load and alternating current terminals of respective phases different from one another, of the three-phase three-level inverter; and
    a controller to generate gate signals for controlling operation of the three-phase three-level inverter and of the three single-phase inverters, based on sinusoidal phase voltage commands, wherein
    the controller
        divides the sinusoidal phase voltage commands into three-phase instantaneous voltage commands to be indicated to the three-phase three-level inverter and mean voltage commands to be indicated to the respective three single-phase inverters, and
        in a case in which a sum of the three-phase instantaneous voltage commands is a positive value, superimposes a common voltage component on each of the three mean voltage commands to make a sum of the three mean voltage commands a non-positive value, or
        in a case in which the sum of the three-phase instantaneous voltage commands is a negative value, superimposes the common voltage component on each of the three mean voltage commands to make the sum of the three mean voltage commands a non-negative value.

2. The power conversion device according to claim 1, wherein
    the controller
        provides pulse width modulation control on each of the three single-phase inverters based on a corresponding one of the mean voltage commands,
        superimposes the common voltage component on each of the three mean voltage commands to make a first mean voltage command equal to a first voltage in a time period during which the first mean voltage command is greater than the first voltage, the first mean voltage command having a highest value among the three mean voltage commands, the first voltage having a maximum value of voltages caused to be output by the single-phase inverters, and superimposes the common voltage component on each of the three mean voltage commands to make a second mean voltage command equal to a second voltage in a time period during which the second mean voltage command is less than the second voltage, the second mean voltage command having a lowest value among the three mean voltage commands, the second voltage having a minimum value of the voltages caused to be output by the single-phase inverters.

3. The power conversion device according to claim 2, wherein the controller superimposes the common voltage component on the three mean voltage commands to make a third mean voltage command equal to zero in a time period during which the first mean voltage command is greater than the first voltage, and a difference between the first mean voltage command and the third mean voltage command is greater than the first voltage, and in a time period during which the second mean voltage command is less than the second voltage, and a difference between the third mean voltage command and the second mean voltage command is greater than the first voltage, the third mean voltage having a middle value among the three mean voltage commands.

4. The power conversion device according to claim 1, wherein the single-phase inverters have a switching frequency higher than a switching frequency of the three-phase three-level inverter.

5. The power conversion device according to claim 1, wherein the sinusoidal phase voltage commands and the instantaneous voltage commands have a same fundamental wave component.

6. The power conversion device according to claim 1, wherein the instantaneous voltage commands each have a single pulse voltage having an absolute value that is ½ of a voltage from the direct current power supply, and having a portion of a positive voltage polarity and a portion of a negative voltage polarity each being repeated once during a fundamental wave period of the sinusoidal phase voltage commands.

7. The power conversion device according to claim 6, wherein the single pulse voltage has a zero value at a phase ranging from zero to $\alpha$, from $\pi-\alpha$ to $\pi+\alpha$, and from $2\pi-\alpha$ to $2\pi$, a positive value at a phase ranging from $\alpha$ to $\pi-\alpha$, and a negative value at a phase ranging from $\pi+\alpha$ to $2\pi-\alpha$, based on a phase and on a phase angle $\alpha$ of the sinusoidal phase voltage commands, and the phase angle $\alpha$ is determined by Equation (1) below, where $v_{php}$ represents an amplitude of the sinusoidal phase voltage commands, and $v_{mdc}$ represents a direct current voltage from the three-phase three-level inverter

[Formula 1]

$$\alpha = \cos^{-1}\left(v_{php}\frac{\pi}{2v_{mdc}}\right). \quad (1)$$

8. The power conversion device according to claim 1, wherein the instantaneous voltage commands each have a three-pulse voltage having an absolute value that is ½ of a voltage from the direct current power supply, and having a portion of a positive voltage polarity and a portion of a negative voltage polarity each being repeated three times during a fundamental wave period of the sinusoidal phase voltage commands.

* * * * *